(12) United States Patent
Brault

(10) Patent No.: US 12,197,704 B2
(45) Date of Patent: Jan. 14, 2025

(54) METHOD AND APPARATUS FOR CONTROLLING A USER INTERFACE

(71) Applicant: GENETEC INC., Saint-Laurent (CA)

(72) Inventor: Mathieu Brault, Saint-Laurent (CA)

(73) Assignee: GENETEC INC., Saint-Laurent (CA)

( * ) Notice: Subject to any disclaimer, the term of this patent is extended or adjusted under 35 U.S.C. 154(b) by 1 day.

(21) Appl. No.: 17/940,575

(22) Filed: Sep. 8, 2022

(65) Prior Publication Data

US 2024/0086038 A1   Mar. 14, 2024

(51) Int. Cl.
*G06F 3/048* (2013.01)
*G06F 3/0484* (2022.01)
*G08B 29/00* (2006.01)

(52) U.S. Cl.
CPC .......... *G06F 3/0484* (2013.01); *G08B 29/00* (2013.01)

(58) Field of Classification Search
CPC .................................................... G06F 3/0484
See application file for complete search history.

(56) References Cited

U.S. PATENT DOCUMENTS

| | | | | |
|---|---|---|---|---|
| 7,373,244 B2* | 5/2008 | Kreft | ................... | G06Q 30/0251 340/988 |
| 9,361,521 B1* | 6/2016 | McLean | ............... | G06F 3/04847 |
| 10,116,905 B2* | 10/2018 | Meganathan | ............ | H04N 5/76 |
| 11,232,685 B1* | 1/2022 | Nixon | ............... | G08B 13/19695 |
| 2008/0258880 A1* | 10/2008 | Smith | ..................... | H04L 67/12 455/404.2 |
| 2012/0130513 A1* | 5/2012 | Hao | ........................ | G05B 15/02 700/90 |
| 2013/0293718 A1* | 11/2013 | M | ...................... | G08B 13/19669 340/541 |
| 2015/0043887 A1* | 2/2015 | Gurudoss | ................ | H04N 7/181 386/230 |
| 2015/0296188 A1* | 10/2015 | Meganathan | ..... | G08B 13/19682 348/143 |
| 2016/0105644 A1* | 4/2016 | Smith | ............... | G08B 13/19667 348/159 |
| 2017/0098126 A1* | 4/2017 | Laska | ................... | G11B 27/028 |
| 2017/0201724 A1* | 7/2017 | Galvin | ............. | G08B 13/19665 |
| 2017/0210724 A1* | 7/2017 | Blaquiere | ............ | C07D 417/14 |
| 2018/0113577 A1* | 4/2018 | Burns | ..................... | G06F 16/739 |
| 2018/0232592 A1* | 8/2018 | Stewart | ............ | G08B 13/19606 |
| 2019/0174316 A1* | 6/2019 | Diem | .................. | G06F 16/9535 |
| 2020/0099896 A1* | 3/2020 | Galvin | ................... | G01D 3/022 |
| 2022/0057917 A1* | 2/2022 | Fulker | ..................... | H04L 67/62 |

\* cited by examiner

*Primary Examiner* — Linh K Pham

(57) ABSTRACT

A computer-implemented user interface control method, a device, and a computer readable storage medium are disclosed to provide a security platform with suggested information, which may be easy to use for searching information of interest. The method is performed at an electronic device with access to a user interface. The method comprises: generating a map for display in a first portion of the user interface; detecting user input made in an area of the user interface; and in response to detecting the user input: obtaining indicia based on the user input; accessing plural information sources based on respective subsets of the indicia to retrieve respective information of interest subsets corresponding to the respective subsets of the indicia; and generating a second portion of the user interface for concurrent display with the map in the first portion, the second portion comprising the retrieved information of interest subsets.

32 Claims, 24 Drawing Sheets

METHOD AND APPARATUS FOR CONTROLLING A USER INTERFACE

FIELD

The present disclosure relates generally to electronic devices and, more particularly, to a computer implemented method for controlling a user interface, such as a graphical user interface, of a security platform.

BACKGROUND

Unified security platforms are a critical tool in the safety equation for places such as buildings, campuses, airports and even entire neighborhoods. A typical security platform connects security systems, sensors, and data in a single interface that can be navigated and actioned by an operator. In most cases, the interface provides a map of the area of interest. As events arise, the security platform places them on the map and if the operator wishes to retrieve more detail about a particular event, the operator may run a report, depending on the type of event that was detected. The operator can find out more information of interest in this way and can commission a further sub-report based on the newly discovered information of interest, until the operator has gathered enough information to conclude whether the event is severe, whether action is required, etc.

From the perspective of user interface control, each report based on an item of information (such as a license plate, user identity, sensor ID, etc.) requires the operator to leave the map and open a new window to run the report, and then each new item of relevant information discovered requires the operator to open a further window to run a sub-report, and so on. This process for controlling the user interface has several disadvantages. Firstly, the process has the potential to clutter the visual display with overlapping windows to a point where the new windows may take up too much screen space and/or interfere with the map. Secondly, the process is time-consuming, as the operator has to run a sequence of reports and sub-reports, and this could involve backtracking and running a new sub-report when multiple items of information are revealed at the same level of the hierarchy. Thirdly, substantial skill and experience are required to navigate through the complex hierarchy of windows, search for the right information and run the right types of reports on that information; this makes it difficult and expensive to find qualified people to operate the user interface of the security platform.

Accordingly, there is a need for a security platform with a user interface that is easy to use, configure, and/or adapt for searching information of interest.

SUMMARY

The present disclosure describes a method of accessing a plurality of information sources to retrieve an information of interest subset based on obtained indicia that are dependent on a type of user input (e.g., such as input made by an operator using an electronic device to access a security platform) in a security system architecture. The type of user input may be an entity-type user input or an event-type user input. Depending on the type of input, the electronic device may obtain the indicia associated with the user input and identify the plurality of information sources to retrieve the information of interest subset. Furthermore, at least part of the retrieved information of interest subset may be displayed in a second portion concurrently with a first portion including a map so as to avoid cluttering the user interface display with overlapping windows. Such a method of displaying suggested information or information of interest associated with the user input in the second portion of the user interface may enable the user to determine whether an event is severe or tell a status of an entity in a short time. What is more, as information elements displayed in the second portion provide details associated with the selected event or entity, navigation through a complex hierarchy of windows may be avoided. Thus, operator training and/or hiring costs may be saved as well.

Accordingly, a first aspect of the present disclosure provides a computer-implemented user interface control method which is performed at an electronic device with access to a user interface. The method comprises: generating a map for display in a first portion of the user interface; detecting user input made in an area of the user interface; and in response to detecting the user input: obtaining indicia based on the user input; accessing plural information sources based on respective subsets of the indicia to retrieve respective information of interest subsets corresponding to the respective subsets of the indicia; and generating a second portion of the user interface for concurrent display with the map in the first portion, the second portion comprising the retrieved information of interest subsets.

In accordance with the preceding aspect, the first portion and the second portion of the user interface are respectively a first pane and a second pane of the user interface, and wherein the retrieved information of interest subsets are presented together within the second pane of the user interface.

In accordance with the preceding aspect, accessing the plural information sources is achieved over plural separate, secure data connections.

In accordance with the preceding aspect, at least two of the information sources comprise separate databases.

In accordance with the preceding aspect, at least two of the information sources comprise separate portions of a common database.

In accordance with the preceding aspect, said accessing comprises accessing a first one of the information sources based on a first subset of the indicia to retrieve a first information of interest subset corresponding to the first subset of the indicia.

In accordance with the preceding aspect, said accessing the first one of the information sources comprises causing the first one of the information sources to generate a report based on the first subset of the indicia and truncating the report to create the first information of interest subset.

In accordance with the preceding aspect, the user input comprises one of selection of an event and selection of an entity.

In accordance with the preceding aspect, the event comprises at least one of an access granted event, a glass broken event, a hit hotlist event, an unattended package event, and an interlock access denied event.

In accordance with the preceding aspect, the entity comprises at least one of a security camera, an access point, a person, a videoconference camera, a building zone, a parking lot, a microphone, a telephone, and a user note.

In accordance with the preceding aspect, when the user input comprises selection of the event, the indicia includes a timestamp indicative of when the event occurred.

In accordance with the preceding aspect, the indicia further includes a location indicative of where the event occurred.

In accordance with the preceding aspect, when the user input comprises selection of the event that defines an access being granted, the indicia comprises a badge identification (ID), and wherein the accessing plural information sources based on respective subsets of the indicia to retrieve respective information of interest subsets corresponding to the respective subsets of indicia comprises accessing a first one of the information sources to retrieve an identity associated with the badge ID.

In accordance with the preceding aspect, the indicia obtained further comprises a door identification (ID) defining a door, wherein the accessing plural information sources based on respective subsets of the indicia to retrieve respective information of interest subsets corresponding to the respective subsets of indicia further comprises accessing a second one of the information sources to retrieve one or more image processing system IDs associated with the door.

In accordance with the preceding aspect, the accessing plural information sources based on respective subsets of the indicia to retrieve respective information of interest subsets corresponding to the respective subsets of indicia further comprises accessing a third one of the information sources to retrieve respective footages captured by one or more image processing systems associated with the one or more image processing system IDs in a first time period preceding the timestamp.

In accordance with the preceding aspect, the accessing plural information sources based on respective subsets of the indicia to retrieve respective information of interest subsets corresponding to the respective subsets of indicia further comprises accessing a fourth one of the information sources to retrieve other badge IDs that accessed the door in a second time period preceding the timestamp.

In accordance with the preceding aspect, the accessing plural information sources based on respective subsets of the indicia to retrieve respective information of interest subsets corresponding to the respective subsets of indicia further comprises accessing the first one of the information sources to retrieve identities of people that correspond to the retrieved other badge IDs.

In accordance with the preceding aspect, the identities include names, email addresses and/or employee identifiers.

In accordance with the preceding aspect, the generating the second portion of the user interface comprises including in the second portion at least one of the retrieved identity associated with the badge ID, the retrieved one or more image processing system IDs associated with the door, the respective footage in the first time period preceding the timestamp and the retrieved other badges IDs.

In accordance with the preceding aspect, when the user input comprises selection of an entity that defines an image processing system, the indicia comprises an image processing system ID of the entity, and wherein the accessing plural information sources based on respective subsets of the indicia to retrieve respective information of interest subsets corresponding to the respective subsets of indicia comprises accessing a first one of the information sources to retrieve livestream footage captured by the image processing system.

In accordance with the preceding aspect, the indicia further comprises a location of the image processing system, and wherein the accessing plural information sources based on respective subsets of the indicia to retrieve respective information of interest subsets corresponding to the respective subsets of indicia further comprises accessing a second one of the information sources to retrieve a thumbnail map shows other entities in a vicinity of the location of the image processing system.

In accordance with the preceding aspect, the accessing plural information sources based on respective subsets of the indicia to retrieve respective information of interest subsets corresponding to the respective subsets of indicia further comprises accessing a third one of the information sources to retrieve a number of most recent events captured by the image processing system.

In accordance with the preceding aspect, the generating the second portion of the user interface comprises including in the second portion at least one of the retrieved livestream footage, the retrieved thumbnail map, and the number of most recent events.

In accordance with the preceding aspect, the area of the user interface is located in the first portion.

In accordance with the preceding aspect, the area of the user interface is located in a third portion that is neither the map nor the second portion.

In accordance with the preceding aspect, the method further comprises identifying the plural information sources based on the respective subsets of the indicia.

In accordance with the preceding aspect, the identifying comprises consulting a database that maps each of the plural information sources to a respective subset of indicia.

In accordance with the preceding aspect, the user input comprises the indicia.

In accordance with the preceding aspect, the accessing plural information sources based on respective subsets of the indicia to retrieve respective information of interest subsets corresponding to the respective subsets of indicia further comprises: sending a respective query to each of the plural information sources, and receiving the respective information of interest subset corresponding to each respective subset of indicia in response to the respective query.

In accordance with the preceding aspect, at least two of the plural information sources are queried contemporaneously.

In accordance with the preceding aspect, the user input is first user input. The indicia is first indicia. The information sources is first information sources. The retrieved information of interest subsets is first information of interest subsets. The first information of interest subsets collectively includes at least one information element defining an event or an entity. The method further comprises: detecting second user input made in the second portion, the second user input identifying one of the at least one information element; in response to detecting the second user input: obtaining second indicia based on the second user input; accessing plural second information sources based on respective subsets of the second indicia to retrieve respective second information of interest subsets corresponding to the respective subsets of the second indicia; and re-generating the second portion for concurrent display with the map in the first portion, the second portion comprising the retrieved second information of interest subsets.

In accordance with the preceding aspect, at least one of the first information sources and a corresponding one of the second information sources are the same information source.

In accordance with the preceding aspect, the method further comprises replacing at least some of the retrieved first information of interest subsets with at least some of the retrieved second information of interest subset in the second portion.

In accordance with the preceding aspect, the user interface includes a screen and wherein the first portion occupies an area of the screen greater in size than an area of the screen occupied by the second portion.

In accordance with the preceding aspect, wherein the user interface includes a touch screen display.

A second aspect of the present disclosure provides a device. The device comprises: a user interface; one or more processor; memory; and one or more programs. The one or more programs are stored in the memory and configured to be executed by the one or more processors. The programs include: instructions for generating a map for display in a first portion of the user interface; instructions for detecting user input made in an area of the user interface; and in response to detecting the user input: instructions for obtaining indicia based on the user input; instructions for accessing plural information sources based on respective subsets of the indicia to retrieve respective information of interest subsets corresponding to the respective subsets of the indicia; and instructions for generating a second portion of the user interface for concurrent display with the map in the first portion, the second portion comprising the retrieved information of interest subsets.

A third aspect of the present disclosure provides a computer readable storage medium. The computer readable storage medium has stored therein instructions, which when executed by a device. The device is caused to: generate a map for display in a first portion of the user interface; detect user input made in an area of the user interface; and in response to detecting the user input: obtain indicia based on the user input; access plural information sources based on respective subsets of the indicia to retrieve respective information of interest subsets corresponding to the respective subsets of the indicia; and generate a second portion of the user interface for concurrent display with the map in the first portion, the second portion comprising the retrieved information of interest subsets.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

Figure 1A:
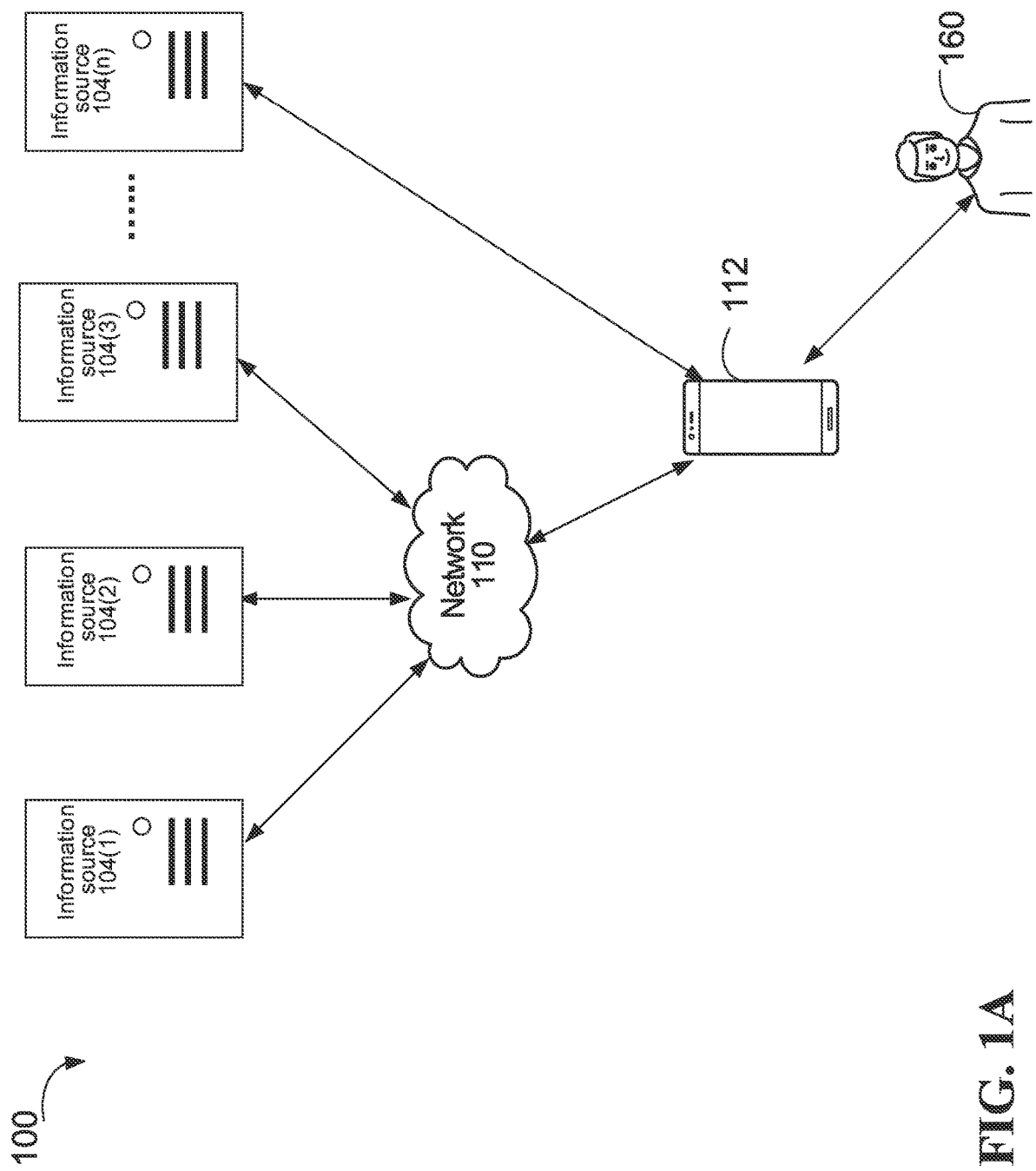
FIG. 1A is a schematic diagram of an example security system architecture in accordance with example embodiments.

In the drawings, embodiments are illustrated by way of example. It is to be expressly understood that the description and drawings are only for purposes of illustrating certain embodiments and are an aid for understanding. They are not intended to be a definition of the limits of the invention.

DESCRIPTION OF EXAMPLE EMBODIMENTS

The present disclosure is made with reference to the accompanying drawings, in which certain non-limiting embodiments are shown. However, the description should not be construed as being limited to the embodiments set forth herein. Rather, these embodiments are provided as examples. Like numbers refer to like elements/components throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they may be illustrated separately for ease of explanation herein. Different devices can have different designs, such that while some devices implement some functions in fixed function hardware, other devices can implement such functions in a programmable processor with code obtained from a machine readable medium.

I. Security System Architecture

The disclosed methods and systems may be used in various applications, including security management of locations such as office buildings, bus terminals, train stations, airports, schools, campuses, stadiums, neighborhoods or entire cities, to name a few non-limiting examples.

FIG. 1A is a schematic diagram illustrating an example security system architecture 100 suitable for operating an electronic device 112 in accordance with a non-limiting example of the present disclosure. The security system architecture 100 comprises a network 110, which can be a public data network such as the internet. The electronic device 112 is connected to the network 110, enabling the electronic device 112 to access one or more services through the network 110. The security system architecture 100 can include multiple different types of communication networks (not shown) in communication with the electronic device 112 and each of these communication networks can be connected directly or indirectly to the network 110.

In some applications, data related to one or more services (e.g., "information of interest subsets" corresponding to respective subsets of "indicia" based on user input, as discussed below) may be stored within respective information sources 104(1)-104(3) accessible over the network 110. The information sources 104(1)-104(3) may be reachable over the network 110 in various non-limiting ways. For example, an information source 104(1) may establish a wired link with the network 110 such that the data can be accessed over the network 110; an information source 104 (2) communicates with the network 110 via cellular communication links; and an information source 104(3) may be coupled with the network 110 by using Wi-Fi wireless network which conforms to IEEE 802.11x standards (sometimes referred to as Wi-Fi®, although in other examples, other communication protocols may be used for the Wi-Fi wireless network).

In some applications, the electronic device 112 may establish any suitable communication link (e.g., wired communication link, cellular network communication link, or Wi-Fi wireless communication link) with the network 110 through which the respective information sources 104(1)-104(3) are accessed to retrieve the "information of interest subsets".

In some applications, the electronic device 112 may also have direct access to one or more such services by local or peer-to-peer (P2P) communication with a local information source 104(n), which also may store information of interest subsets corresponding to certain subsets of indicia. With respect to the P2P communication link established between the electronic device 112 and the local information source 104(n), the local information source 104(n) and the electronic device 112 are end-hosts (also referred to as peers) to establish a direct local link in an ad-hoc manner. That means, the information source 104(n) and the electronic device 112 are both suppliers and consumers of resources (e.g., general documents, audio, video, data records), in contrast to traditional client-server architecture in which the consumption and supply of resources is segregated. Various protocols, such as Advanced peer-to-peer networking (APPN), BitTorrent, Direct Connect, FastTrack, and so on, may be applied by the P2P communication.

The information sources 104(1)-104(n) are collectively referred to as information sources 104 and in some applications, the information sources 104 may also be referred to as servers. It should be appreciated that although the drawing shows three network-connected information sources 104(1)-104(3) and one directly connected information source 104(n), there is no particular limitation on the number of information sources of either kind.

In some cases, information source 104(1) may store information of interest subsets corresponding a given subset of indicia (e.g., employee names corresponding to badge IDs), and the electronic device 112 may then access a storage unit(s) at the information source 104(1) via the network 110. However, in some examples, some of the information stored by the information sources 104 may be stored additionally or alternatively at the electronic device 112 itself. As such, a database mapping each subset of indicia to a corresponding information of interest subset may be stored at the electronic device 112. This is illustrative and not intended to be limiting. In other possible configurations, the electronic device 112 may access any other entity of the security system architecture 100 (even those not shown) to retrieve information of interest subsets.

In the embodiment of FIG. 1A, the electronic device 112 may be any component (or collection of components) capable of carrying out a graphical user interface (GUI) and communicating with the information sources 104. To this end, the electronic device 112 could be a desktop console used by a user 160, but it could also be a tablet, a laptop or even a mobile phone. In various non-limiting embodiments, the user 160 may be an administrator, a work area supervisor or a member of law enforcement, for example.

A graphical user interface (GUI) can be defined as functionality for displaying information for visualization by a user, receiving input from the user pertaining to the displayed information, associating the user input to the displayed information and taking an action based on the displayed information associated with the user input. In some cases, a GUI can be implemented by a combination of a display, a mouse/keyboard and an input/output controller, whereas in other cases, a GUI can be implemented by a touchscreen and touchscreen controller. Other embodiments are of course possible.

Figure 1B:
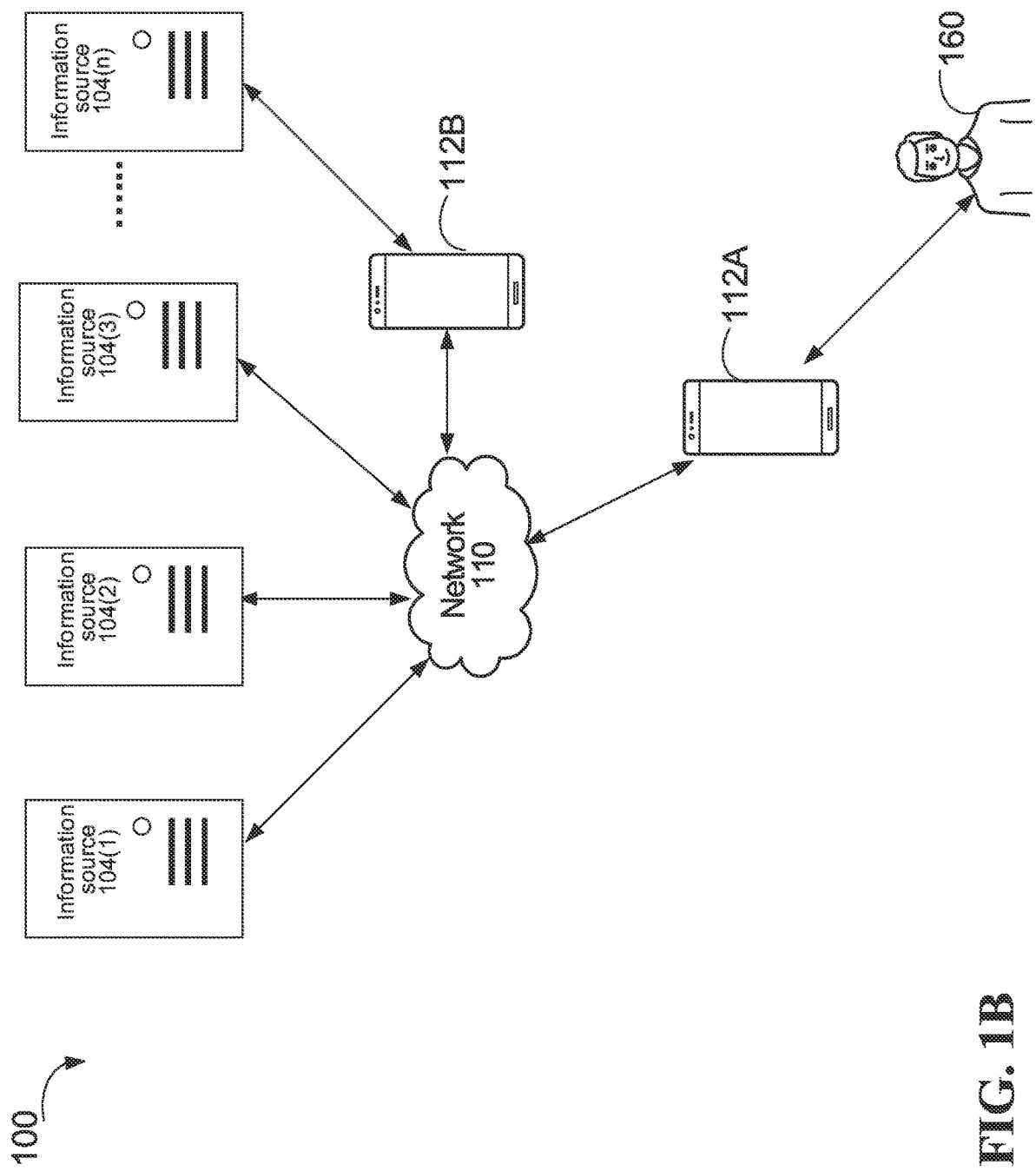
FIG. 1B is a schematic diagram of an example security system architecture in accordance with alternative example embodiments.

While in the embodiment of FIG. 1A, the functions of implementing the GUI and communicating with the information sources 104 are carried out by the same electronic device 112, this functionality can be distributed among separate devices. Accordingly, FIG. 1B is a schematic diagram illustrating an example security system architecture 100 in accordance with another non-limiting embodiment in which an electronic device 112A implements the GUI and an electronic device 112B communicates with the network information sources 104. For simplicity, the electronic devices 112A and 112B can be collectively referred to as an electronic device 112 in the below description.

II. Electronic Device

Figure 2:
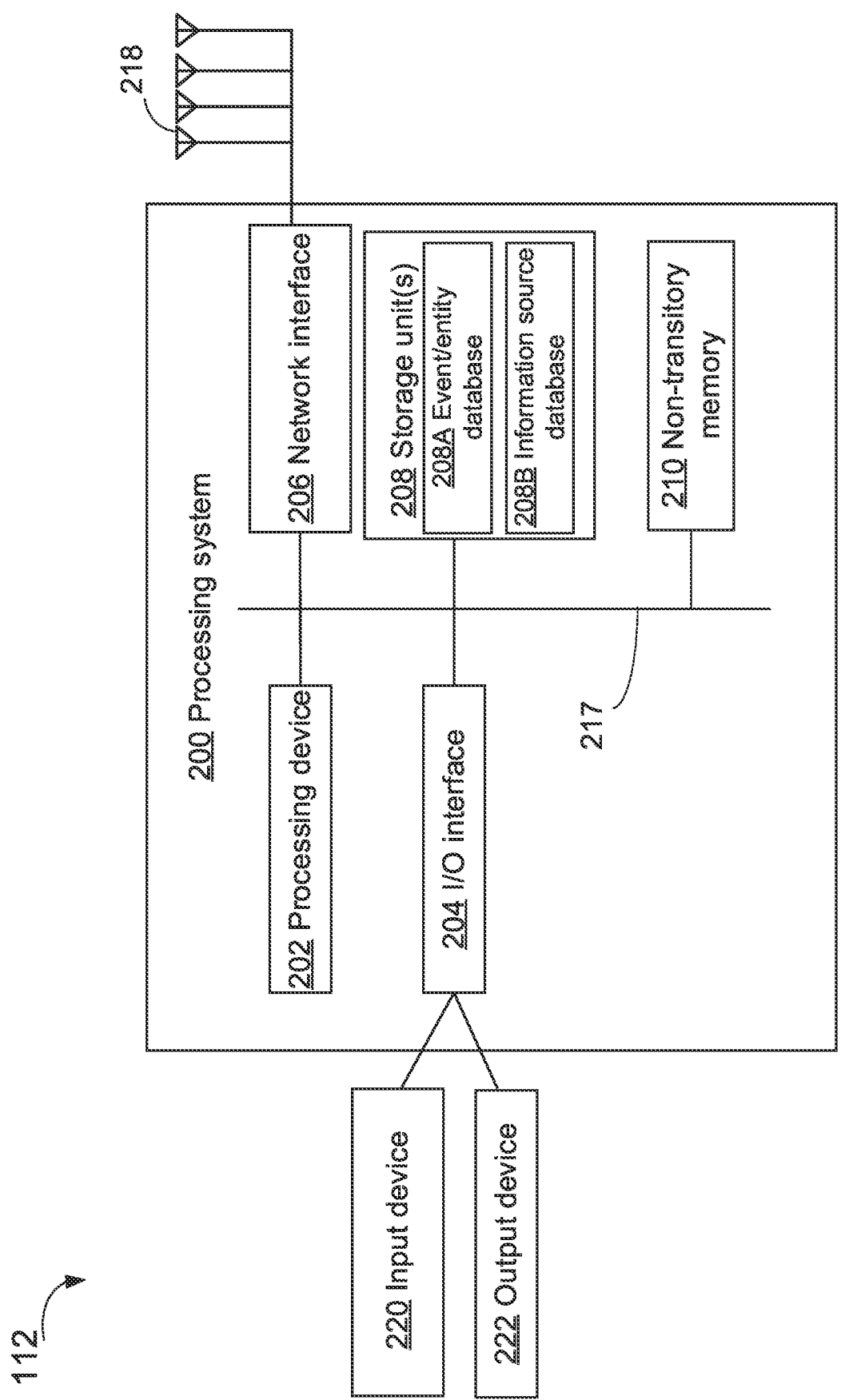
FIG. 2 is a block diagram illustrating an example processing system suitable for implementing an electronic device in the security system architecture of FIG. 1A or 1B.

Configurations of the electronic device 112 will be discussed in greater detail below with reference to the simplified block diagram of FIG. 2. The electronic device 112 comprises a processing system 200. The example processing system 200 described below, or variations thereof, may be used to implement certain functionality of the electronic device 112. However, other processing system architectures may be suitable for implementing the electronic device 112 and may include components different from those discussed below. Although FIG. 2 shows a single instance of each component in the processing system 200, there may be multiple instances of each component.

The processing system 200 may include one or more processing devices 202, such as a central processing unit (CPU), a graphics processing unit (GPU), a tensor processing unit (TPU), a neural processing unit (NPU), an application-specific integrated circuit (ASIC), a field-programmable gate array (FPGA), a dedicated logic circuitry, or combinations thereof. The processing system 200 may include one or more input/output (I/O) controllers 204, to enable interfacing with one or more input devices 220 and/or output devices 222.

The processing system 200 may further include one or more network interfaces 206 for wired or wireless communication with the communication network 110 or peer-to-peer communication with other processing systems, such as a processing system 300 (see FIG. 3) of the information source 104. The network interface(s) 206 may include wired links (e.g., Ethernet cable) and/or wireless links (e.g., one or more antennas) for intra-network and/or inter-network communications. The network interface 206 may be connected to one or more antennas 218 of the electronic device, which are configured to facilitate wireless communication that may be implemented by the network interface 206.

The processing system 200 may also include or have access to one or more storage units 208, which may include a mass storage unit such as a solid state drive, a hard disk drive, a magnetic disk drive and/or an optical disk drive. In some examples, the storage unit(s) 208 may implement an event/entity database 208A that stores information pertaining to events and entities that are presented to the user 160 of the electronic device 112. In some examples, the storage unit(s) 208 may implement an information source database 208B that stores an association between subsets of indicia and corresponding network addresses of information sources. The usefulness of the event/entity database 208A and the information source database 208B will become apparent later on from a reading of this document.

The processing system 200 may include one or more non-transitory memories 210, which may include a volatile or non-volatile memory (e.g., a flash memory, a random-access memory (RAM), and/or a read-only memory (ROM)). The non-transitory memory(ies) 210 may store instructions for execution by the processing device(s) 202, such as to carry out example methods described in the present disclosure. The memory(ies) 210 may store other software (e.g., instructions for execution by the processing device(s) 202), such as an operating system and other applications/functions. In some examples, one or more data sets and/or modules may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 217 providing communication among components of the processing system 200, including the processing device(s) 202, I/O controller 204, network interface(s) 206, storage unit(s) 208, and/or memory(ies) 210. The bus 217 may be any suitable bus architecture including, for example, a memory bus, a peripheral bus or a video bus.

In FIG. 2, an input device(s) 220 and an output device(s) 224 are shown as external to the processing system 200. The input device(s) 220 may include at least one of a keyboard, a mouse, and a microphone, which receive input from the user 160. The output device(s) 224 may include at least one of a display and a loudspeaker, which provide audio and visual output to the user 160. In other examples, one or more of the input device(s) 220 and/or the output device(s) 222 may be integrated together and/or with the processing system 200. For example, the input device 220 and the output device 222 may be integrated as a single component, such as a touch-sensitive display screen which, together with the I/O controller 204 being implemented as a touchscreen controller, carries out a graphical user interface. In that case, the user 160 interacts with the GUI primarily through finger contacts and gestures on the touch-sensitive display.

III. Information Sources

Figure 3:
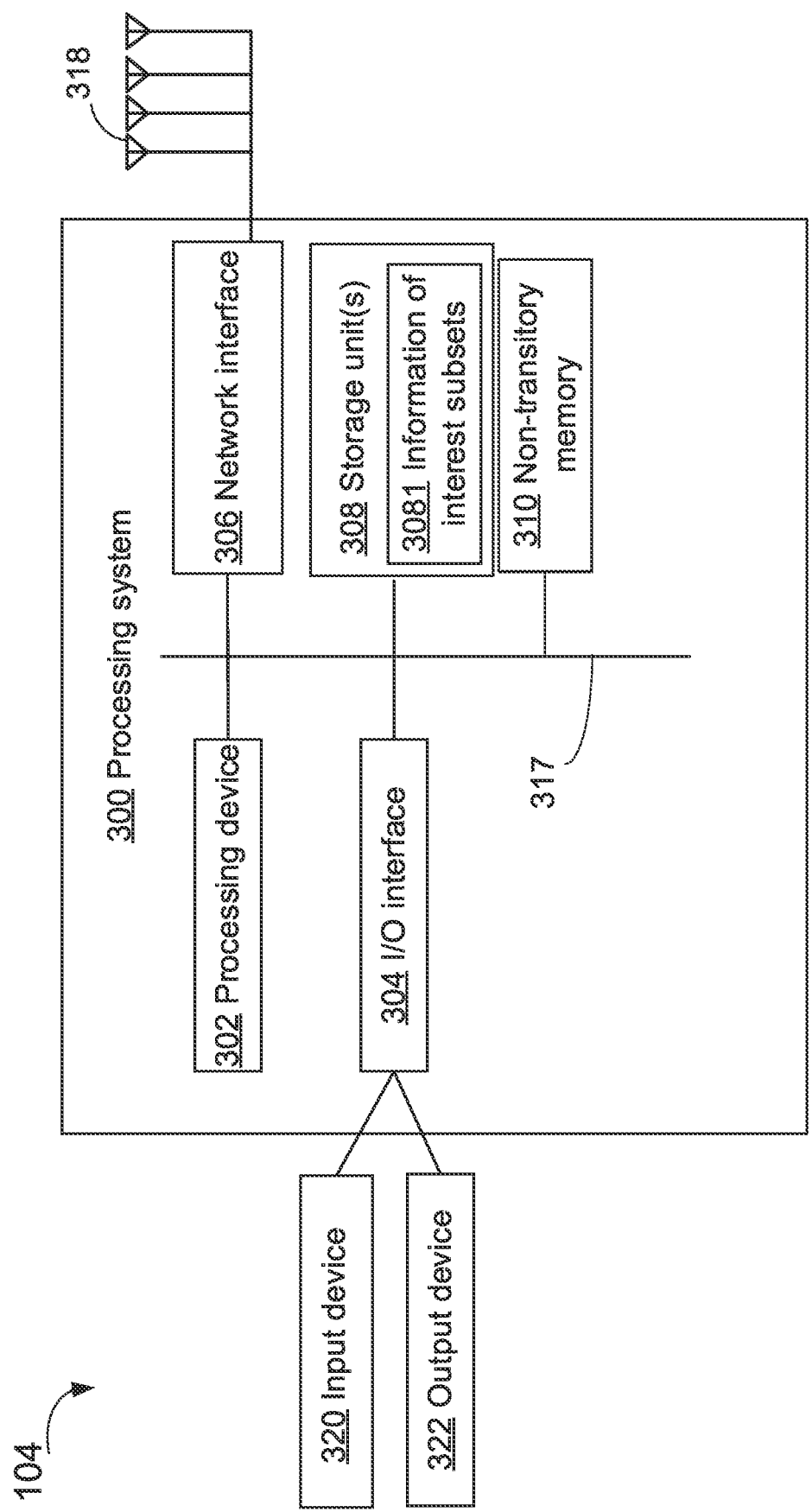
FIG. 3 is a block diagram illustrating an example processing system suitable for implementing an information source in the security system architecture system of FIG. 1A or 1B.

FIG. 3 is a block diagram of an example simplified processing system 300, which may be used to implement any or each of the information sources 104. A given one of the information sources 104 may also be referred to as a "centralized device", which provides centrally stored information such as license plate hotlists, images, status, identity, and/or livestream videos to the electronic device 112, either via the network 110 or via a direct communication link. Components of the processing system 300 are similar to those of the processing system 200 as shown in FIG. 2. A notable exception is the absence of a GUI. That is to say, the information sources 104 might not include any display (including touchscreen), mouse, keyboard or microphone, as they might not be designed for interfacing with a user. Rather, the main function of the information sources 104 includes collecting, managing, and storing information of interest subsets that correspond to respective subsets of indicia.

In particular, the processing system 300 may include one or more network interfaces 306 for wired or wireless communication with the network 110 or peer-to-peer communication with the processing system 200 of the electronic device 112, depending on the implementation. One or more storage units 308 may store information of interest subsets 3081 corresponding to a given subset of indicia, which will be discussed further below.

IV. User Interface Control Method

One of the methods carried out by the processing device(s) 202 executing the computer-readable instructions in the memory(ies) 210 includes obtaining indicia based on user input made in an area of a graphical user interface, retrieving relevant information of information subsets from one or more of the information sources 104 and configuring the concurrent display of multiple portions (or "panes") of the graphical user interface, one of which includes the retrieved information of interest subsets.

As a result of this method, a map is generated for display in a first portion (e.g., a first pane) of the graphical user interface and the content of a second portion (e.g., a second pane) of the graphical user interface is displayed concurrently with the first portion of the graphical user interface and is varied as a result of interaction with the user 160. In various embodiments, the second portion of the graphical user interface may be a right side pane, a left side pane, a top pane, a bottom pane or a combination thereof. In other embodiments, the second portion of the graphical user interface need not be a pane (e.g., it can be an overlay or bubble).

The second portion of the graphical user interface contains suggested information of interest subsets, which are retrieved in response to a sequence of inputs from the user 160. The suggested information of interest subsets displayed in the second portion of the graphical user interface are displayed concurrently with the first portion of the graphical user interface, which contains a map. This helps the user 160 keep some of their attention on a geographic area of interest on the map while consuming more detailed information (i.e., the information of interest subset) in the second portion of the graphical user interface.

Figure 4:
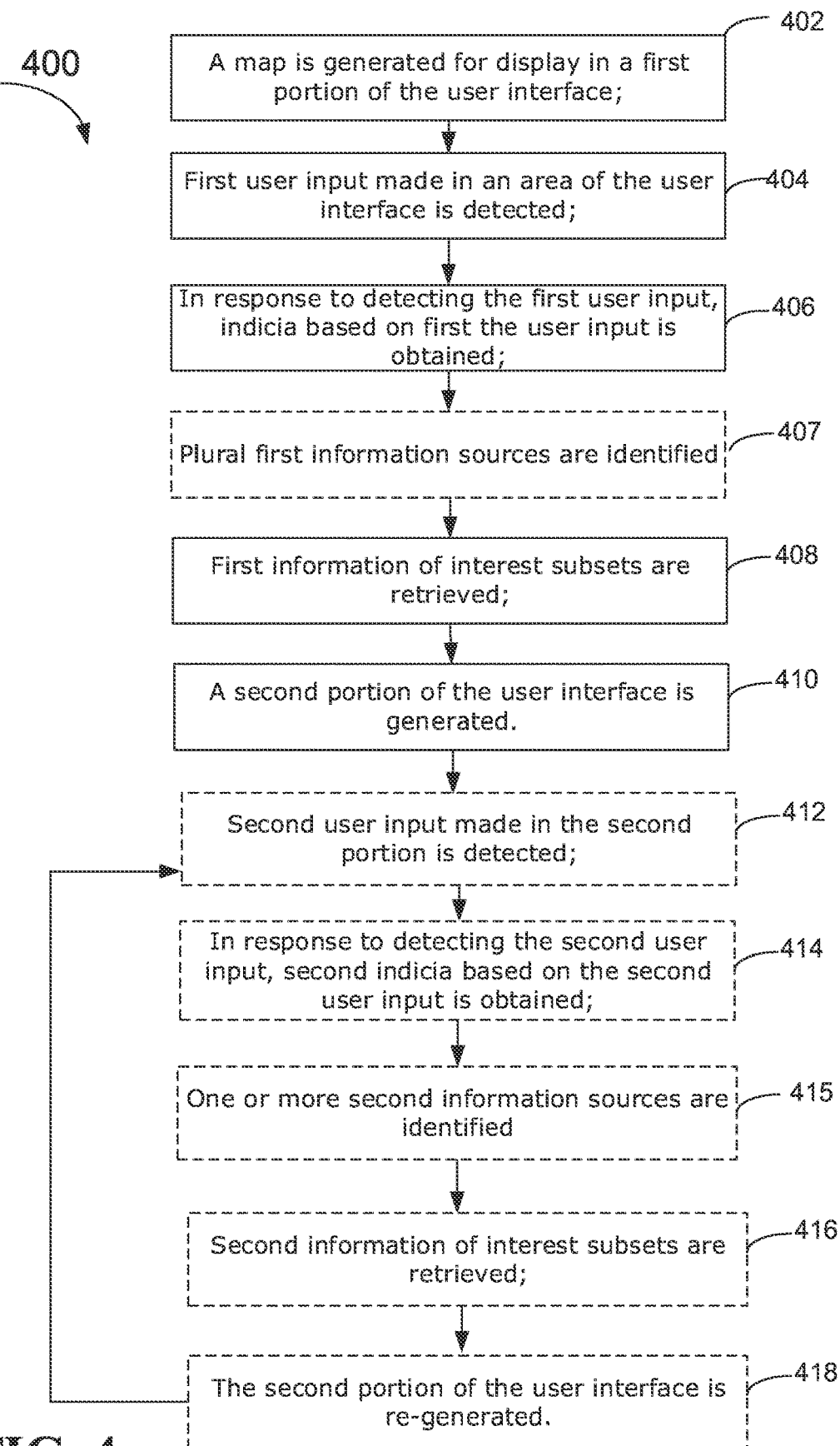
FIG. 4 is a flowchart illustrating a method of user interface control in accordance with example embodiments.

With reference therefore to FIG. 4, an example method 400 may be implemented by the electronic device 112 configured with a touch-sensitive display, mouse/keyboard-driven GUI or other implementation of a graphical user interface as discussed above.

Step 402:

At step 402, a map is generated for display in a first portion of the graphical user interface, which may be displayed when the user 160 opens an application (such as a security application) or a webpage of the electronic device 112.

The first portion of the graphical user interface may include a map with various actionable information elements (e.g., icons), a sidebar with various actionable information elements and a search field allowing the entry of words by the user. Actionable information elements can represent "events" (which typically have a timestamp) or "entities" (which typically do not). Also, words entered in the search field can also represent "entities". Each such event or entity is associated with indicia that are stored in the event/entity database 208A.

Step 404:

At step 404, first user input is detected. At this stage of the method, the first user input is provided in an area of the first portion of the graphical user interface. The first user input could be provided by selecting one of the actionable information elements illustrated on the map, by selecting an actionable information element listed in the sidebar or by entering words in the search field.

Step 406:

At step 406, in response to detecting the first user input, indicia based on the first user input is obtained. By virtue of implementing the graphical user interface, the electronic device 112 is aware of what event or entity is represented by the first user input. As such, the electronic device 112 accesses the event/entity database 208A (if necessary) and extracts the relevant indicia.

In the case where the first user input consisted of selecting an actionable information element corresponding to an event (e.g., selection of an "access granted" icon somewhere on the map), the indicia may comprise a timestamp and location associated with that event and possibly identifier information regarding that event (e.g., door ID and badge ID).

In the case where the first user input consisted of selecting an actionable information element corresponding to an entity (e.g., selection of a "door" icon somewhere on the map), the indicia may comprise an identifier of the selected entity (e.g., door ID), together with (optionally) a location (e.g., a floor, a room, or an area where the door is located).

In the case where the first user input consisted of providing words in a search field (e.g., "Jane Doe"), the indicia may comprise those words.

The electronic device 112 then proceeds to execute further steps in order to retrieve at least one "information of interest subset" corresponding to at least one subset (which can include the entirety of) the indicia obtained at step 406. It is worth noting that in some cases, a single one of the information sources 104 can be consulted based on a single subset of the indicia, whereas in other cases, plural ones of the information sources 104 can be consulted based on respective subsets of the indicia.

Step 407:

At step 407, one or more of the information sources 104 are identified based on respective subsets of the indicia. In other words, different combinations of the indicia may be useful for accessing different ones of the information sources 104 to obtain different information of interest subsets. The more data elements that are contained in the indicia, the greater the number of possible subsets (combinations) of indicia that may be used for accessing the information sources 104. However, not all possible subsets of the indicia are used for accessing the information sources 104. The rule that sets out which of the information sources 104 are to be queried based on which subsets of the indicia can be stored in the information source database 208B. This rule may be configurable for different users, times of day or other circumstances. As such, different security platform operators may have flexibility in determining which information sources are to be queried, so that the retrieved information of interest subsets represent information considered be relevant for the users of the security platform.

Step 408:

At step 408, the electronic device 112 accesses the identified one or more information sources 104 based on the respective one or more subsets of the indicia (as specified by the information source database 208B) to retrieve one or more information of interest subsets corresponding the respective one or more subsets of the indicia. It is recalled that some of the information sources (e.g., information sources 104(1), 104(2) and 104(3) in FIG. 1) may be accessed over the network 110 whereas others of the information sources (e.g., information source 104(n) in FIG. 1) may be accessed by the electronic device 112 over the direct local link.

Figure 6:
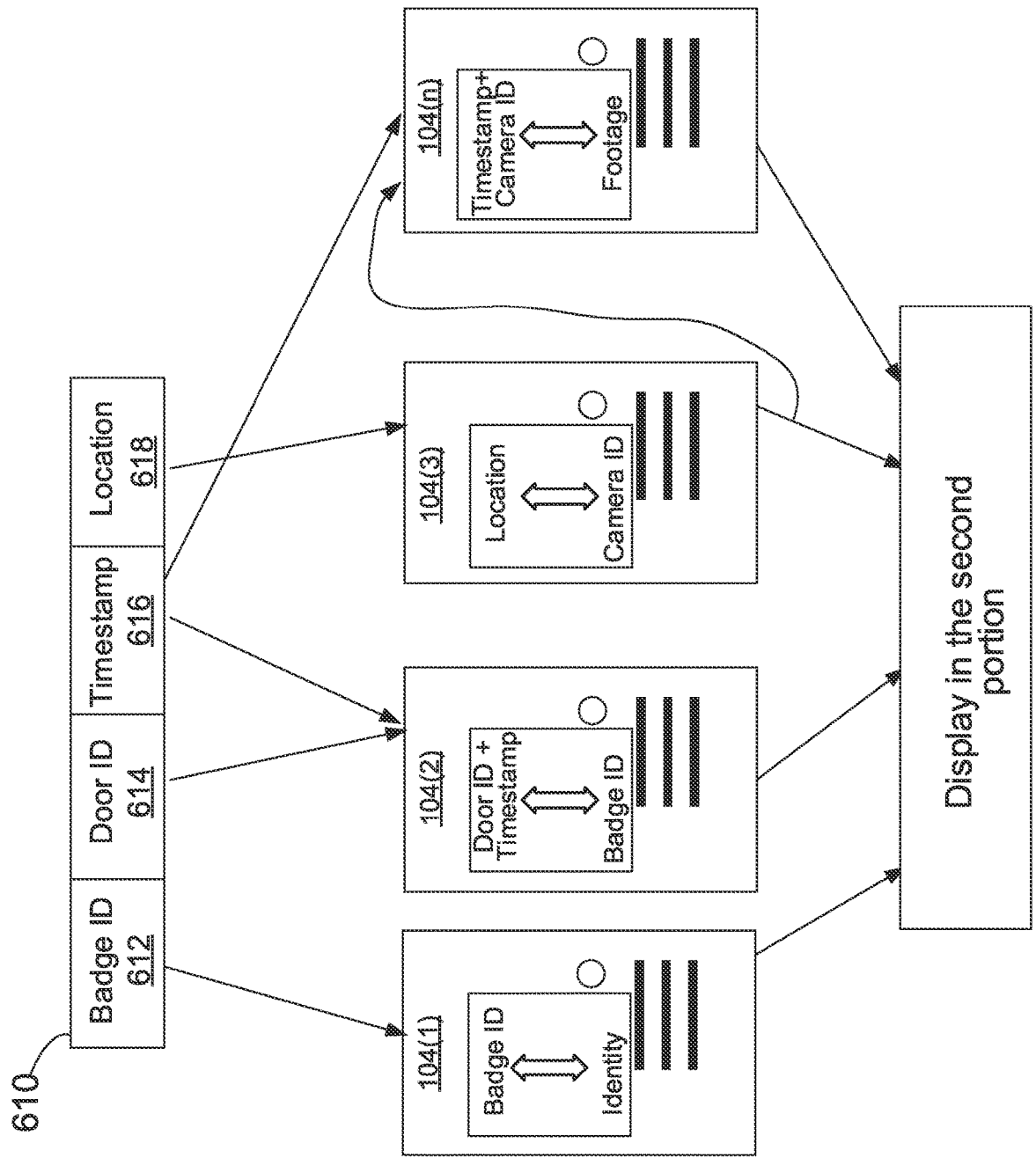
FIG. 6 is a schematic diagram illustrating how a plurality of information sources are accessed based on different respective subsets of indicia to retrieve corresponding information of interest subsets in accordance with example embodiments.

Consider with reference to FIG. 6 the non-limiting example of an access granted event, for which the indicia 610 obtained at step 406 might include a badge ID 612 (which identifies the specific badge for which access was granted), a door ID 614 (which identifies a specific door where access was granted) a timestamp 616 (which identifies the time when access was granted) and a location 618 (which identifies the location of the specific door). In some examples, relationships between subsets of the indicia 610 (e.g., corresponding subsets of the badge ID 612, the door ID 614, the timestamp 616, and the location 618) and corresponding ones of the information sources 104 are stored in the information source database 208B. For example:

The badge ID 612 (example subset of the indicia) may be used to access one information source (e.g., 104(1)) that stores an association between badge IDs and identities so as to learn the identity of the person to whom access was granted (example of an information of interest subset). The identity associated with a particular badge ID may include at least one of a name, an email addresses and/or an employee identifier.

The door ID 614 and the timestamp 616 (another example subset of the indicia) may be used to access another information source (e.g., 104(2)) that stores all access attempts at all doors in the building so as to know which other badge IDs attempted to access the door corresponding to the door ID 614 at around the same time as the time corresponding to the timestamp 616 (another example of an information of interest subset).

The location 618 (another example subset of the indicia) may be used to access another information source (e.g., 104(3)) that stores camera IDs covering various locations or areas so as to know which cameras cover the location 618.

Furthermore, the retrieved camera ID (from information source 104(3)) and the timestamp 616 can be used to access another information source (e.g., 104(n)) that stores video footage for all cameras so as to retrieve video footage around the time of the time stamp 616 captured by the camera having the camera ID retrieved from information source 104(3). This could include video footage from a few seconds before and a few seconds after the timestamp 616, for example.

In the example of FIG. 6, the information sources 104 (1)-(n) are illustrated to be separate servers each of which comprises a separate database. Each of the information sources 104(1)-(n) may establish a separate, secure data connection with the electronic device 112 (either over the network 110 or locally, as the case may be). In other examples, at least two of the information sources 104(1)-(n) may comprise separate portions of a common database. For examples, the video footage managed by the information source 104(n) and the camera IDs stored in the information source 104(3) may be separate portions of a single common database.

In some applications, at least two of the information sources 104 are queried contemporaneously or in parallel, based on different subsets of the indicia obtained at step 406. This can save time as the requested information of interest subsets will be received faster. However, as exemplified by the above scenario involving information source 104(n), elements of the indicia obtained at step 406 may need to be combined with elements of a retrieved information of interest subset to access a further information of interest subset, which would require sequential querying of the information sources 104.

In some cases, a particular one of the information sources 104, when queried, may produce a report for consumption by the electronic device. This report may be longer than necessary and may include information that is not considered relevant. The electronic device 112 may thus be configured to truncate this report received from the particular information source so as to produce the information of interest subset.

Step 410:

At step 410, a second portion of the graphical user interface is generated for concurrent display with the map in the first portion of the graphical user interface. The second portion of the graphical user interface may comprise information elements representing the retrieved one or more information of interest subsets. Specifically, the information of interest subsets include information elements that may correspond to events or entities. These information elements are displayed in the second portion of the graphical user interface such a manner that they are selectable by the user 160 (e.g., via the graphical user interface). This allows the user to select a particular information element for further investigation, as will now be described.

In some embodiments, the first portion of the graphical user interface may be compressed or truncated so as to make space for the second portion of the graphical user interface. This could lead to compression of truncation of the map in the first portion of the graphical user interface.

Step 412:

At step 412, second user input made in the second portion may be detected. For example, the electronic device 112 detects user selection of one of the displayed information elements. For example, as the user 160 reviews information elements shown in the second portion, the user 160 may tap/select any such information element on the second portion, which serves as the second user input. The selected information element may define an event or an entity.

Step 414:

At step 414, in response to detecting the second user input, indicia based on the second user input is obtained. The way that the indica is obtained is similar to the way in which the indicia was obtained from the first user input at step 406.

That is to say, the electronic device 112 knows what event or entity was intended to be selected using the second user input, and accesses the event/entity database 208A (if necessary) to extract the associated set of indicia for the selected event or entity.

Here again, where the user input (albeit in this case, the second user input) consisted of selecting an event, the indicia may comprise a timestamp and location and possibly identifier information regarding that event; where the second user input consisted of selecting a specific entity (selection of a specifically identified entity, etc.), the indicia may comprise an identifier of the selected entity, together with (optionally) a location (e.g., a floor, a room, or an area) of the selected entity; and where the second user input consisted of selecting an entity by providing words in the form of entry of specific keywords in a search field, the first indicia may comprise those keywords.

Step 415:

At step 415, which is analogous to step 407, one or more of the information sources 104 are again identified based on respective subsets of the indicia obtained at step 414. The indicia obtained at step 414 may be different than the indicia obtained at step 406. As such, a different combination of the newly obtained indicia may be used for accessing a different subset of the information sources 104 to obtain different information of interest subsets. Rules that set out which information sources are to be queried based on which subsets of the newly obtained indicia (and at what network addresses these information sources can be reached) can be stored in the information source database 208B.

Step 416:

At step 416, the electronic device 112 accesses the identified one or more information sources 104 based on the respective one or more subsets of the indicia (as specified by the information source database 208B) to retrieve one or more information of interest subsets corresponding the respective one or more subsets of the indicia. It is recalled that some of the information sources (e.g., information sources 104(1), 104(2) and 104(3) in FIG. 1) may be accessed over the network 110 whereas others of the information sources (e.g., information source 104(n) in FIG. 1) may be accessed by the electronic device 112 over a direct local link.

It is noted that some of the information sources identified at step 407 and accessed at step 408 may be the same as some of the information sources identified at step 415 and accessed at step 416 (i.e., they will be queried for a second time), whereas some of the information sources queried at step 408 might not be queried at step 416 and vice versa.

Step 418:

At step 418, the second portion of the graphical user interface is re-generated for concurrent display with the map in the first portion of the graphical user interface. In some examples, where the second portion is a side pane, the re-generated second portion of the graphical user interface may be displayed in the same side pane to replace at least part of the second portion of the graphical user interface that was generated at step 410.

The re-generated second portion of the graphical user interface may comprise information elements representing the one or more information of interest subsets retrieved at step 416. Specifically, the information of interest subsets include information elements that may correspond to events or entities. These information elements are displayed in the re-generated second portion of the graphical user interface such a manner that they are selectable by the user 160 (e.g., via the graphical user interface). This allows the user to select a particular information element for yet further investigation, and so on. In particular, if additional user input is received, steps 412-418 will be performed again in response to such additional user input, providing the user 160 with suggested information for further exploration in the second portion of the graphical user interface. Of course, the user 160 remains free to access any actionable information element in the first portion of the graphical user interface (containing the map). The user 160 may also select/tap a "back" button on the graphical user interface to return to a previously generated second portion of the graphical user interface.

As such, the aforementioned description illustrates how the electronic device 112 can respond to receipt of user input (e.g., first user input, second user input, etc.,) in a navigational sequence. Each time, a different respective second portion of the graphical user interface is displayed concurrently with the first portion of the graphical user interface. Example with Reference to FIGS. 5A to 5D

By way of non-limiting example, operation of the method 400 of FIG. 4 is now described with additional reference to FIGS. 5A-5D, which illustrate a sequence of four GUIs 500(1)-500(4).

Initial GUI

Figure 5A:
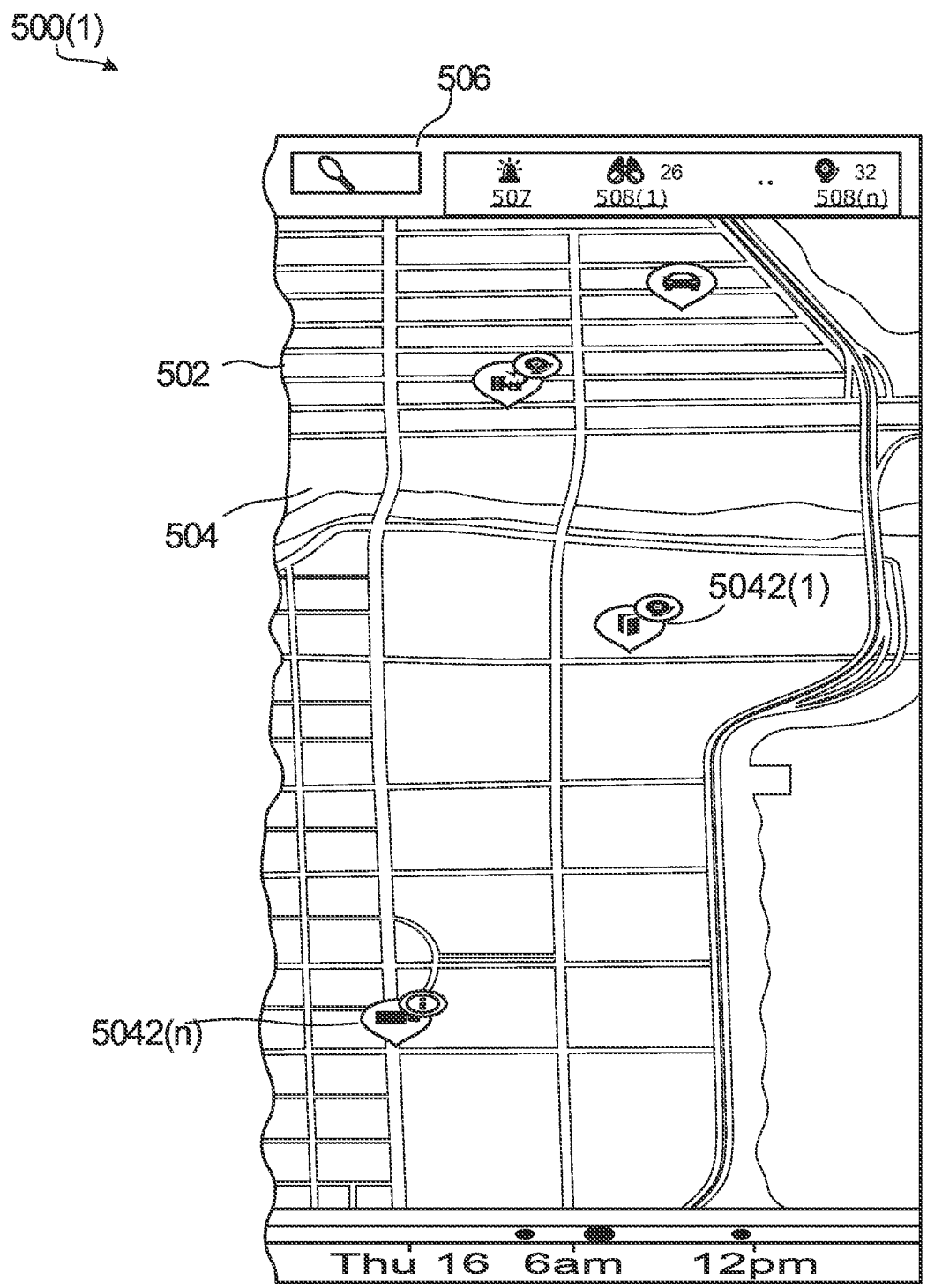
FIG. 5A is an exemplary user interface of an electronic device of FIG. 1A or FIG. 1B.

Beginning with FIG. 5A, GUI 500(1) includes a first portion 502 with a map 504, a search field 506, and a sidebar. The map 504 comprises one or more icons 5042(1)-5042(n) each of which represents an event. An event represented by one of the icons 5042(1)-5042(n) can be associated with indicia such as (i) a timestamp indicative of when the event occurred and (ii) a location indicative of where the event occurred. The location can be in the format of a GPS location or a floor/room of a building, for example.

In addition, an event represented by one of the icons 5042(1)-5042(n) may further be associated with additional indicia representative of an identifier that depends on the event "subtype". Non-limiting examples of event subtypes include "access granted", "glass break", "license plate hotlist", "unattended package" and "interlock access denied". Some of these subtypes have specific identifiers as indicia.

For example, in the case of an "access granted" event subtype, the indicia may include a badge identifier (ID) and a door ID, wherein the door ID represents an identifier of a specific door where access was granted and the badge ID represents an identifier of a specific badge to which access through the specific door. In the case of a "glass break" event subtype, the indicia may include a window ID, wherein the window ID represents an identifier of a specific window that was broken. In the case of a "license plate hotlist" event subtype, the indicia may include a license plate number or ID, wherein the license plate ID represents an identifier of a specific license plate that was detected to be on a hotlist. In the case of an "interlock access denied" event subtype, the indicia may include an interlock access ID, wherein the interlock access ID represents an identifier of a specific interlock access point where access was denied. In the case of an "unattended package" event subtype, the indicia may include a package ID, wherein the package ID represents an identifier of the unattended package.

Occurrence of events may be recorded by one or more systems (e.g., collections of sensors and processors) and the related indicia is stored in the indicia event/entity database 208A. Specifically, as events are detected throughout the region of interest (which may go beyond the limits of the map 504), the indicia (timestamp, location and possibly identifier(s)) are collected and stored in the event/entity database 208A. The event/entity database 208A thus stores the indicia for all detected events including the events for which corresponding icons 5042(1)-5042(n) are displayed on the map 504 and also other events that are not shown on the map 504.

An algorithm could be implemented for determining which events to show on the map 504 and which events not to show on the map 504; such algorithm could be based on event aging, for example, so that only events occurring in the past X minutes are shown.

As mentioned above, the first portion 502 of the GUI 500(1) also includes a sidebar. The sidebar may include an alarm icon 507. The alarm icon 507 indicates the occurrence of at least one alarm without a specific associated icon on the map 504. However, each alarm has a timestamp (e.g., when it started and/or the duration) and a location where the alarm occurred, and therefore each alarm qualifies as an event. The timestamp and the location associated with each alarm are stored in the event/entity database 208A.

Also as mentioned above, the first portion 502 of the GUI 500(1) further includes a search field 506 and entity icons 508(1)-508(n) (generically referred to as entity icon 508) on the sidebar. The information in the search field 506 and the information elements represented by the entity icons 508 lack a timestamp and might not have a location either. As such, in contrast to "events", these information elements are considered "entities".

The entities that may be represented by the entity icons 508 can include security cameras, access points, people, video conference cameras, building zones, parking lots, microphones, telephones and user notes, to name a few non-limiting possibilities. In the example of FIG. 5A, the entity icons 508 are collectively displayed on a single area on the GUI 500(1), such as the sidebar on the top of the first portion 502. In other alternative examples, the entity icons 508 may be individually displayed in a different respective portion of the GUI 500(1). For example, actionable information elements representing entities may be displayed as respective icons within the map 504. Furthermore, the entity icons 508 may be collectively displayed in a portion that is different than the first portion 502.

The indicia associated with an entity characterized by an identifier can be the identifier itself. In some cases, the indicia associated with an entity can further include a location of the entity.

For example, in the case of an entity that is a specific camera characterized by a camera ID, the indicia may include the camera ID and a location of the specific camera (which would be known to the system). In the case of an entity that is the name of a specific person characterized by a badge ID, the indicia may include the name of the specific person, the specific person's badge ID and the specific person's access permissions.

As such, each event or entity is linked to indicia in the event/entity database 208A so that when the user 160 is detected as having selected an event or an entity, the associated indicia can be extracted from the event/entity database 208A.

User Input Made in an Area of the Initial GUI

In some examples, the area of the GUI 500(1) where first user input is detected is located in the first portion 502 (e.g., the map 504, the search field 506, the alarm icon 507 or the entity icons 508) of the GUI 500(1). In other examples, the area of the GUI 500(1) where first user input is detected is located in another portion of the GUI 500(1) that is different than the first portion 502.

The first user input may consist of selecting an event (hereinafter referred to as an event-type user input). This can be achieved by selecting one of the icons 5042(1)-5042(n) on the map 504, any entry from a list, or the alarm icon 507 as shown in FIG. 5A.

The first user input may also consist of selecting an entity (hereinafter referred to as an entity-type user input). This may be achieved by selecting one of the entity icons 508 in the sidebar, by entering information in the search field 506, or by selecting entity icon located elsewhere in the first portion 502 of the GUI 500(1), for instance an entity icon located in the map 504.

In this specific example, the user 160 may wish to investigate a specific entity (for example, a specific security camera) by tapping or clicking an entity icon 508(n) on the side bar. The tapping or clicking gesture serves as the first user input and, in this case, is entity-type user input. Accordingly, once the "security camera" entity icon 508(n) is selected, a list of security cameras may be displayed, and the user 160 may tap or select the entity "security camera A" from the displayed list.

Obtaining Indicia Based on User Input

The electronic device 112 recognizes that the "security camera" entity icon 508(n) has been selected and, moreover, that the "security camera A" entity was selected from the list of security cameras displayed further to selection of the "security camera" entity icon 508(n). As such, the electronic device 112 consults the event/entity database 208A to obtain indicia associated with the "security camera A" entity. In this particular case, let it be assumed that the indicia associated with the selected security camera includes (i) the camera ID (e.g., "security camera A") and (ii) a location of the selected security camera.

Determine which Information Sources to Access

Based on the obtained indicia, the electronic device 112 may consult the information source database 208B to identify respective information sources each corresponding to a different combination (subset) of the indicia. For example, a first, second and third one of the information sources 104 may be identified. In particular, the first information source may store associations between camera IDs and livestream footage captured by the cameras having those camera IDs; the second information source may store associations between locations and thumbnail maps of those locations; and the third information source may store associations between camera IDs and events associated with cameras having those camera IDs.

Retrieve Information of Interest Subsets

Once the first, second, and third information sources have been identified based on various respective subsets of the indicia, the electronic device 112 may send a respective query to each of the first, second, and third information sources to extract a corresponding information of interest subset. The respective query may include a corresponding subset of indicia. The first, second and third information sources may be reached at a network address found in the information source database 208B.

For example, when the first information source is accessed, based on the received camera ID ("security camera A"), the livestream footage captured by the corresponding camera is retrieved and sent to the electronic device 112. The electronic device 112 further accesses the second information source to extract the thumbnail map of the received location (of the camera). Furthermore, the electronic device 112 may query the identified third information source to request the third information source to provide a certain number of most recent events captured by the camera having the received camera ID.

Generate Second Portion for Concurrent Display with First Portion

Figure 5B:
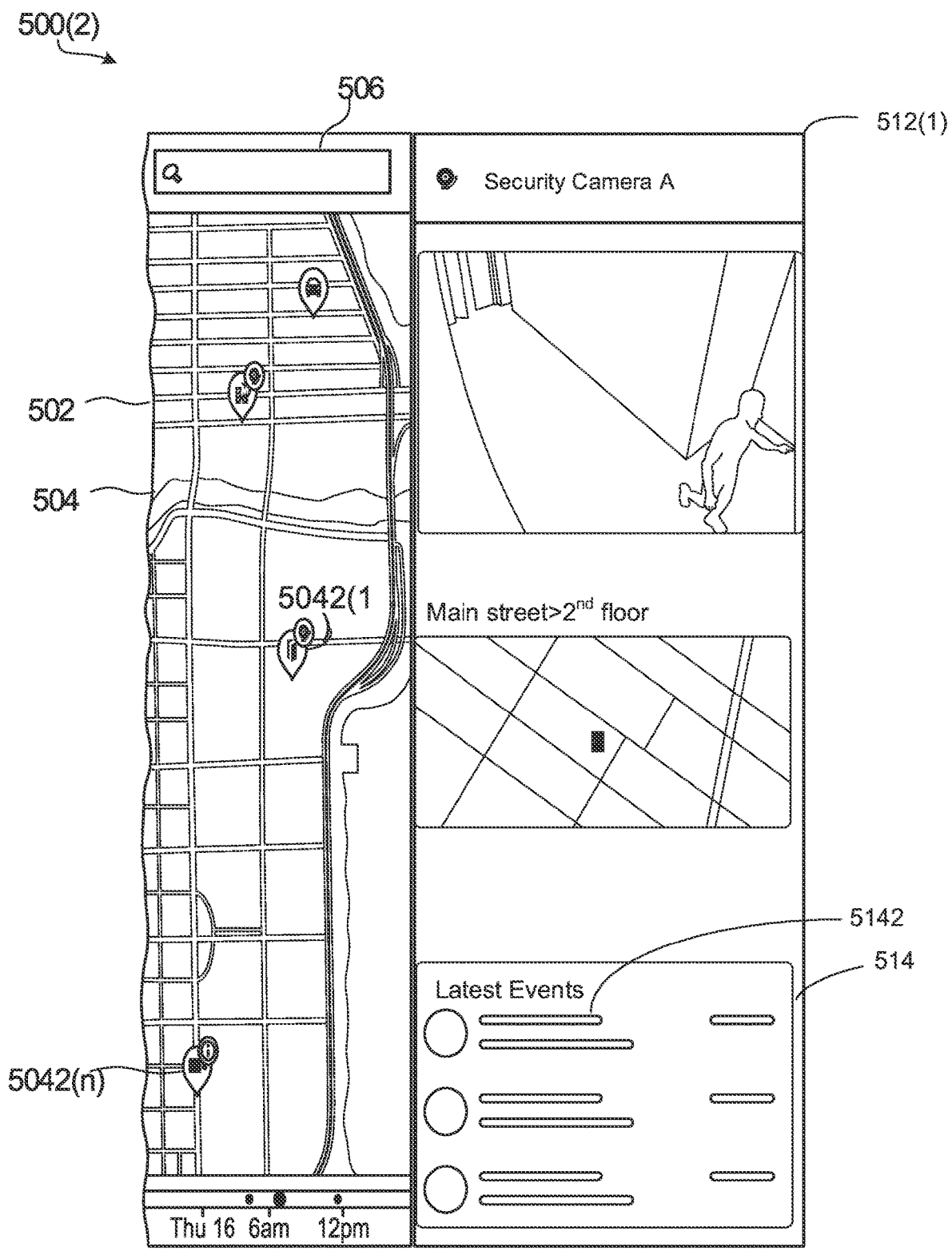
FIG. 5B is an exemplary user interface of receiving first user input which is made in an area of FIG. 5A.

FIG. 5B shows an example second portion 512(1) of the GUI 500(2) that can be generated by the electronic device 112 in response to the user 160 having made the previously described selection within the GUI 500(1). In the example of FIG. 5B, the generated second portion 512(1) is adjacent the first portion 502 on the GUI 500(2). That is, the second portion 512(1) takes the form of a pane that is displayed concurrently with the map 504 in the first portion 502 of the GUI 500(2).

FIG. 5B shows that the second portion 512(1) provides "primary information" associated with the entity having the camera ID "security camera A". The primary information includes the at least part of the retrieved information of interest subsets, each of which corresponds to a respective subset of the indicia defined by the first user input. The primary information provides information pertaining to the selected entity that is expected to be of interest or relevance to the user 160. As the entity 508(n) is determined to be the security camera with camera ID "security camera A" then, from the perspective of security management, the interesting or relevant information associated with the security camera A might be footage captured the vicinity of the location of the selected security camera, the location of the selected security camera on a map, and an indication of most recent events captured by the selected security camera. Such primary information displayed at the user's fingertips may answer the user's intuitive questions regarding the selected entity (i.e., the selected security camera having camera ID "security camera A") automatically. The efficiency of acquiring information with respect to the selected entity may thus be improved significantly.

In the example of FIG. 5B, the primary information comprises a camera ID (e.g., "security camera A"), live video footage captured by the selected security camera, a thumbnail map detailing a location (e.g., second floor of a building on Main Street) of the selected security camera and showing other entities in the vicinity of the location, and a list of "latest events" 514 involving the selected security camera. The list of "latest events" 514 may include, for instance, an indication that access was granted to the "Conference Room 1" door within the field of view of the selected security camera at 11:28:01 AM or a package was left in front of the "Conference Room 1" door at 11:20:05 AM and a wallet was left in the hallway in the vicinity of the selected security camera at 11:02:00 AM.

Based on content displayed on the second portion 512(1), the user 160 notices that an event 5142 indicating that access to the "Conference Room 1" door was granted .at 11:28:01 AM and may then wish to investigate such "access granted" event by tapping or clicking the event 5142 in the list of "latest events" 514.

Second User Input Made

The selection of the event 5142 in the second portion 512(1) is considered to be second user input and is an event-type user input.

Obtaining Indicia Based on Second User Input

As the electronic device 112 detects that the second user input is a selection of the "access granted" event, the indicia obtained from the event/entity database 208A may include a door ID "Conference Room 1", time "11:28:01 AM", location "second floor of a building on Main street", and badge ID "123ABD".

Determine which Information Sources to Access

At this point, the electronic device 112 may consult the information source database 208B to determine which information sources are to be queried and accessed (and at what network addresses). With respect to the "access granted" event, referring to FIG. 6 again, in accordance with the information source database 208B, the information source 104(1), which stores the association between badge IDs and identities, is identified to extract a corresponding identity of the badge ID 123ABD. Similarly, the information source 104(2), the information source 104(3), and another information source 104(n) are identified and accessed, thereby to retrieve respective information of interest subsets of the door ID "Conference Room 1", the time "11:28:01 AM", and the location "second floor of the building on Main street".

It is noted that the manner of identifying information sources in response to the second user input (also referred to as second time information source identification) is similar to that of identifying the information sources for the first user input (also known as first time information source identification). The event/entity database 208A may be commonly used for the first and second time information source identification.

Retrieve Information of Interest Subsets

With the information sources 104(1), 104(2), 104(3), and 104(n) having been identified, the electronic device 112 may query each information source to solicit information of interest corresponding to each subset of the obtained indicia. The query sent to a particular information source may include a particular subset of indicia. In particular, as shown in FIG. 6. the electronic device 112 may send a query including the badge ID 123ABD to the information source 104(1), and the information source 104(1) looks up associations saved internally to extract that an identity (e.g., name, photo, and/or credentials) of "John Smith" is associated with the badge ID 123ABD. Likewise, the information source 104(2) is accessed by receiving a query including the door ID "Conference Room 1" and the timestamp "11:28:01 AM". The information source 104(2) then retrieves that other badge IDs attempted to access the door "Conference Room 1". Similarly, camera IDs (e.g., camera A, B, and C) corresponding to the location "second floor of the building on Main street" are extracted by the information source 104(3), and the information source 104(n) is accessed to retrieve respective video footages around the time "11:28:01 AM" at the camera A, B, and C.

Re-Generate Second Portion for Concurrent Display with First Portion

Figure 5C:
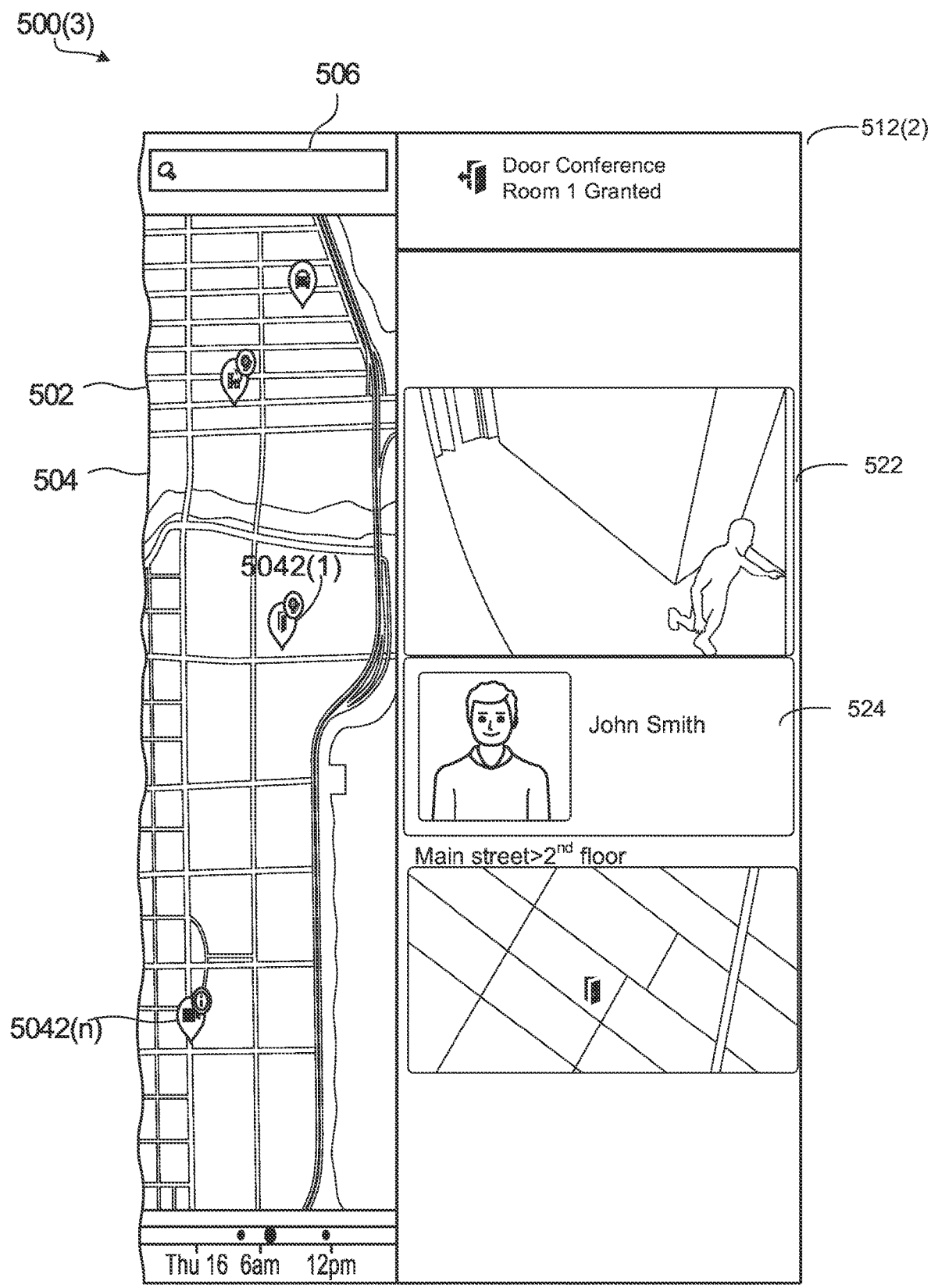
FIG. 5C is an exemplary user interface of receiving second user input which is made in a second portion of FIG. 5B.

FIG. 5C shows a re-generated second portion 512(2) on the GUI 500(3). The re-generated second portion 512(2) is produced in response to the second user input selecting the "access granted" event 5142 in the list 514 on the generated second portion 512(1) of FIG. 5B, and further to retrieval of the information of interest subsets based on respective subsets of indicia obtained from the second user input.

As presented in FIG. 5C, the re-generated second portion 512(2) provides "secondary information" that is associated with the second user input defining the "access granted" event 5142. The "secondary information" comprises at least part of the extracted information of interest subsets each of which corresponds to a respective subset of the indicia obtained from the second user input. In this specific example, the "secondary information" includes a brief description (e.g., access granted) of the selected event 5142, an image (e.g., a snapshot) 522 capturing the selected event 5142, an ID 524 (e.g., "John Smith"), and a thumbnail a location (e.g., second floor of a building on Main Street) of the selected event 5142.

Figure 5D:
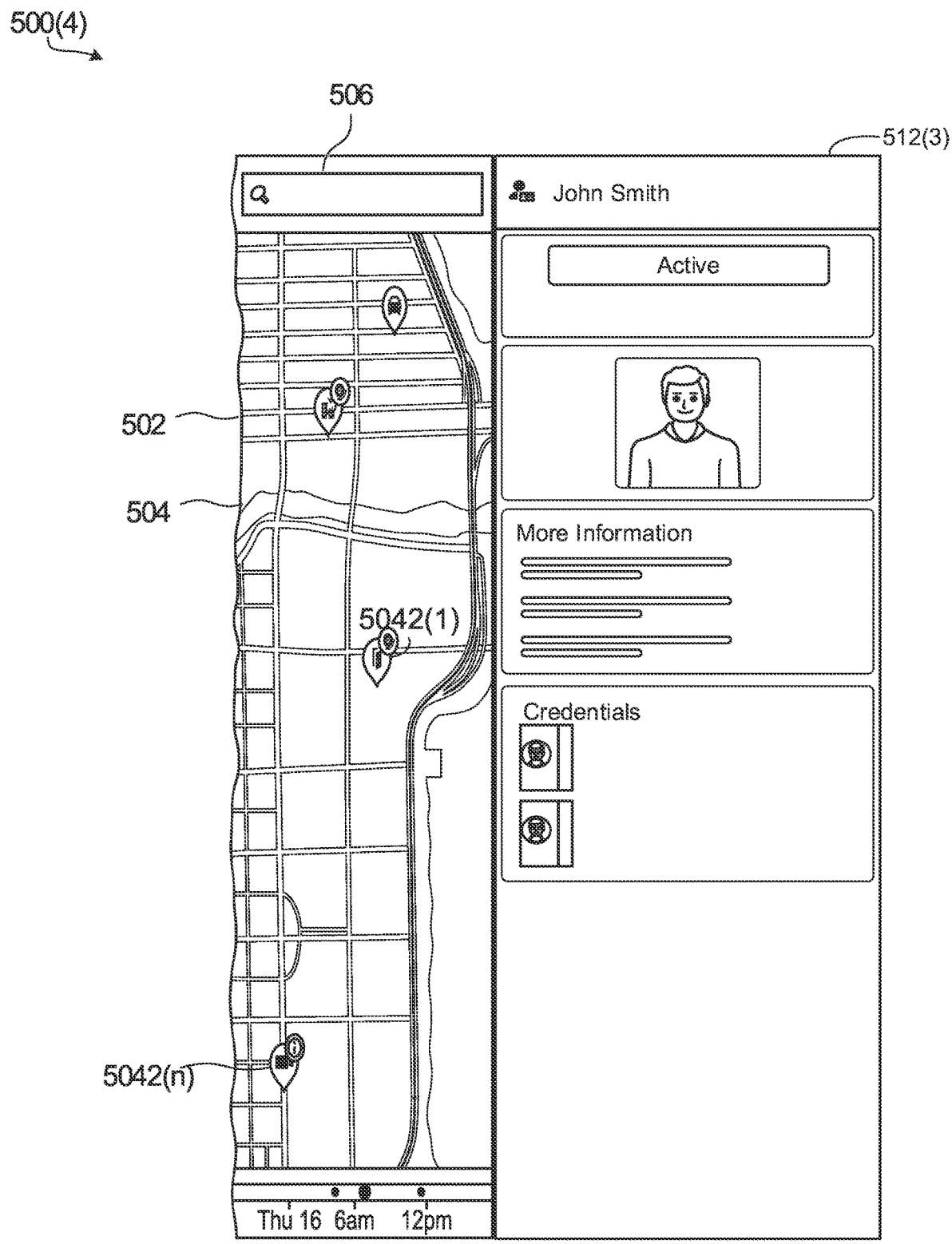
FIG. 5D is an exemplary user interface of receiving third user input which is made in a second portion of FIG. 5C.

Once the content of the re-generated second portion 512(2) is displayed on the GUI 500(3), the user 160 may select the person in the image 522 or select the ID "John Smith" in block 524, which constitutes third user input. Those of skill in the art will appreciate that this would trigger the electronic device 112 to re-perform steps 412-418 of the method 400. With reference to FIG. 5D, this could result in the generation of a further re-generated second portion (different than the previously re-generated second portion 512(2)) which is displayed on GUI 500(4). The further re-generated second portion 512(3) provides suggested information of interest associated with the ID "John Smith". The suggested information of interest is also called tertiary information, which is generated in response to the third user input made in the re-generated second portion 512(2). In FIG. 5D, the further re-generated second portion 512(3) details an employment status, a phone, more information (e.g., email, work phone, mobile phone, office location, job title, business address, employment ID, home address, emergency contact, etc.,), and credentials of the ID "John Smith".

From the above discussion of FIGS. 5A-5D, each of the second portion 512(1), the re-generated second portion 512(2) and the further re-generated second portion 512(3) is concurrently display with the first portion 502 on the graphical user interface of the electronic device 112 in response to different respective user input. The nature of the user input drives the electronic device 112 to consult different combinations of the information sources to retrieve different information that might be of relevance to the user. This information is retrieved in advance of the user having explicitly requesting it. In other words, the user may select an information element representing an event or entity, and the electronic device consults potentially disparate information sources to retrieve information related to this event or entity that the user may find of interest, without the user having to tediously query the various information sources.

It should be understood that the "primary information", the "secondary information", and the "tertiary information" are relatively defined based on a sequence of the user inputs. For example, in the example of FIGS. 5A-5D, the first user input is a selection of a "security camera" entity and the second user input includes tapping or clicking an "access granted" event. Therefore, information of interest subsets associated with the "security camera" entity is called the "primary information" and information of interest subsets with respect to the "access granted" event is referred to the "secondary information". That does not imply that the "secondary information" is less interesting or less relevant than the "primary information", only that it is obtained with respect to the second user input (e.g., selection of the "access granted" event 5142 in the list 514) as opposed to the first user input (e.g., selection of the "security camera" entity).

It is also noted that the same event may be actionable in multiple areas of the graphical user interface and may be represented in multiple ways. For example, consider that an "access granted" event 5042(1) appears on the map 504 in association with an actionable balloon shaped icon 50421(1). This "access granted" event 5042(1) may be an identical event to the "access granted" event 5142 in the list 514 (shown in FIG. 5B), which is actionable by selecting the event from the list 514. As such, a "second pane" that would generated in response to selecting the "access granted" event 5042(1) via the balloon shaped icon 50421(1) may be similar to a "second pane" that would generated in response to selecting the "access granted" event 5142 in the list 514.

Variant:

It should be understood that the respective design of the second portion 512(1) (i.e., the generated second portion as shown in FIG. 5B), the re-generated second portion 512(2) of FIG. 5C, or the further re-generated second portion 512(3) of FIG. 5D may be varied.

Figure 7:
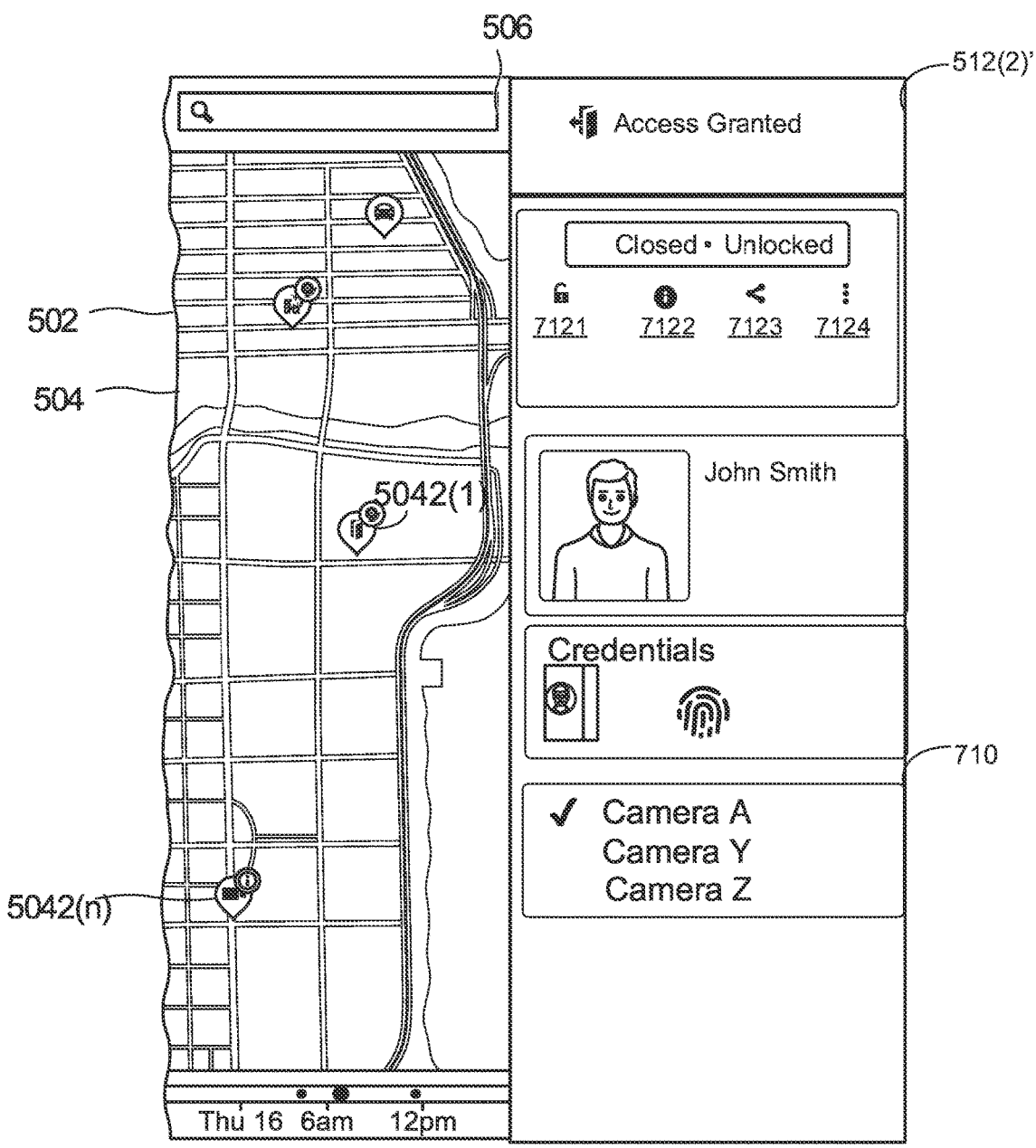
FIG. 7 is an alternative user interface of FIG. 5C.

For example, FIG. 7 illustrates how content may be alternatively arranged in the re-generated second portion 512(2)' in response to the second user input of selecting the event 5142 in the list 514 as presented in FIG. 5B. Compared with FIG. 5C, the re-generated second portion 512(2) of FIG. 5C is similar to the alternative re-generated second portion 512(2)' in FIG. 7, except that a plurality of image processing system IDs 710 (e.g., camera X, camera Y, and camera Z) are displayed in the alternative re-generated second portion 512(2)'. The two re-generated second portions 512(2), 512(2)' are two alternative examples to display details included in the secondary information in response to the second user input. There are illustrative examples and not intended to be limiting. In other examples, arrangement of the re-generated second portion 512(2), 512(2)' may be pre-configured or pre-determined based on a preference of the user 160. Thus, the re-generated second portion 512(2) or 512(2)' may include any suitable information of interest subset in response to different respective user input.

In some applications, since each second portion (e.g., second portion 512(1) (i.e., the generated second portion as shown in FIG. 5B), the re-generated second portion 512(2) of FIG. 5C, or the further re-generated second portion 512(3)) is generated to display at least part of the retrieved information of interest subsets, some retrieved information of interested subsets may be omitted from the displayed second portion in accordance with a pre-configured design of the second portion. In other alternative examples, information elements on the second portion may include additional actionable information elements or icons, such as icons 7121-7124 as shown in FIG. 7, other than the retrieved information of interest subsets. In the example of FIG. 7, the icons 7121-7124 may be preconfigured or designed for the second portion 512(2)' in order to provide different respective menus which are selectable and relevant to the event or entity in question (in this case, an "access granted" event). For example, the icon 7121 provides an option of unlocking the door manually. The icon 7122 may include information of an administrator of the door. The icon 7123 provides an option to share the event with others, and the icon 7124 is a three dots menu which is associated with additional options that are selectable by the user 160.

Other Examples of Selection of an Event

FIGS. 8A-8D illustrate different respective second portions, each of which includes retrieved information of interest subsets in response to user input defining an event, such as a glass break event, a hit hotlist event (also referred to as a license plate hotlist event), an unattended package event, and an interlock access denied event, in accordance with example embodiments. The user input of examples in FIGS. 8A-8D can be the first user input, the second user input, the third user input, or any user input in a sequence of user inputs.

Regarding the selected event being a glass broken event, the electronic device 112 may obtain indicia based on the glass broken event in response to detecting the selection of the glass broken event. The indicia may include a timestamp indicative the time of when a window is broken, a location indicative of where the window is broken, a window ID identifying the window, and so on. The electronic device 112 then identifies a plurality of information sources 104 each of which manages information of interest subsets corresponding to respective subsets (e.g., a timestamp, a location, or a window ID) of the indicia. Based on a respective network address of each information source, the electronic device 112 accesses the respective information source 104 to retrieve one or more image processing system IDs (e.g., security camera IDs) associated with the window ID and one or more security alarm IDs associated with the location.

Figure 8A:
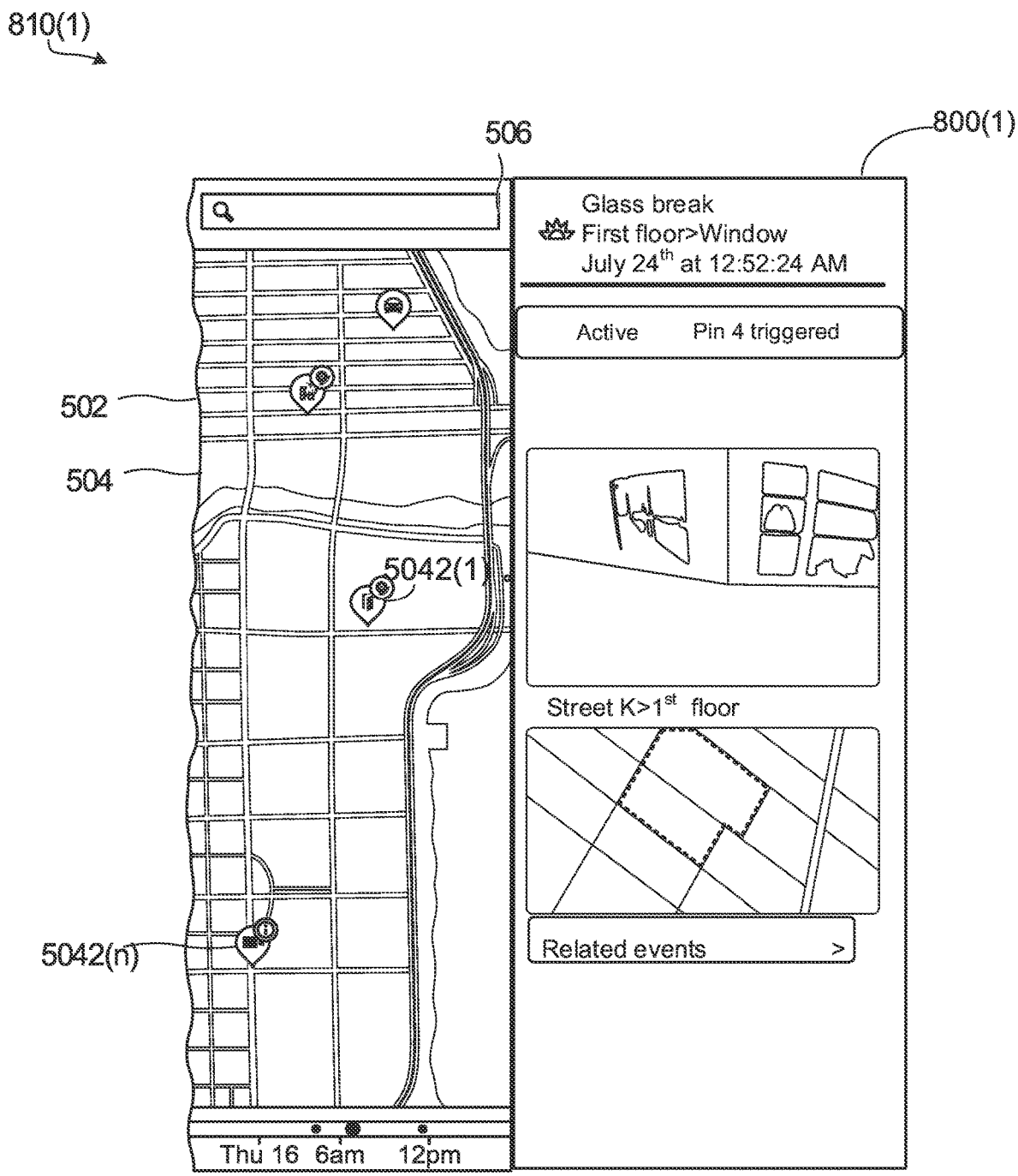
FIGS. 8A-8D are alternative exemplary user interfaces of receiving user input defining a different respective event in accordance with example embodiments.

FIG. 8A illustrates that the retrieved information of interest subset associated with the glass broken event is included in an example second portion 800(1). In particular, the second portion 800(1) includes a description of the glass broken event which specifies a location (e.g., first floor) of the event and a timestamp (e.g., July 24$^{th}$ at 12:52:24 AM) of the event. In addition, the second portion 800(1) further comprises a status (e.g., active) of an image processing system associated with the window, a security alarm (e.g., pin 4) being triggered, and an image showing the glass broken event captured by the image processing system. In some examples, a thumbnail map may be included in the second portion 800(1) as well. The thumbnail map details the location (e.g., 1$^{nd}$ floor in a building around a street "Street K") where the glass broken event occurs, and related events in the vicinity of the location (e.g., all the glass broken events or door broken events in the vicinity of the building on a given street "Street K").

In a scenario where the event is a license plate hotlist event, the electronic device 112 may obtain indicia based on the license plate hotlist event in response to detecting the selection of the license plate hotlist event. The indicia may include a timestamp indicative of the time of when a license plate matching event (a "hit") occurs, a location indicative of where the hit occurs, a license plate ID identifying a specific license plate that was detected to be on the hotlist because of the hit, and so on. By accessing a plurality of information resources, the electronic device 112 may retrieve a profile (e.g., color, manufacturer, and/or year) of a vehicle associated with the license plate ID, one or more ID (e.g., one or more driver licenses) associated with the license plate ID, and historical accidents associated with the license plate ID from one more information sources 104 of an insurance company. Furthermore, the electronic device 112 may also retrieve all accidents occurring at the location from an information source or other accidents associated with the license plate ID.

Figure 8B:
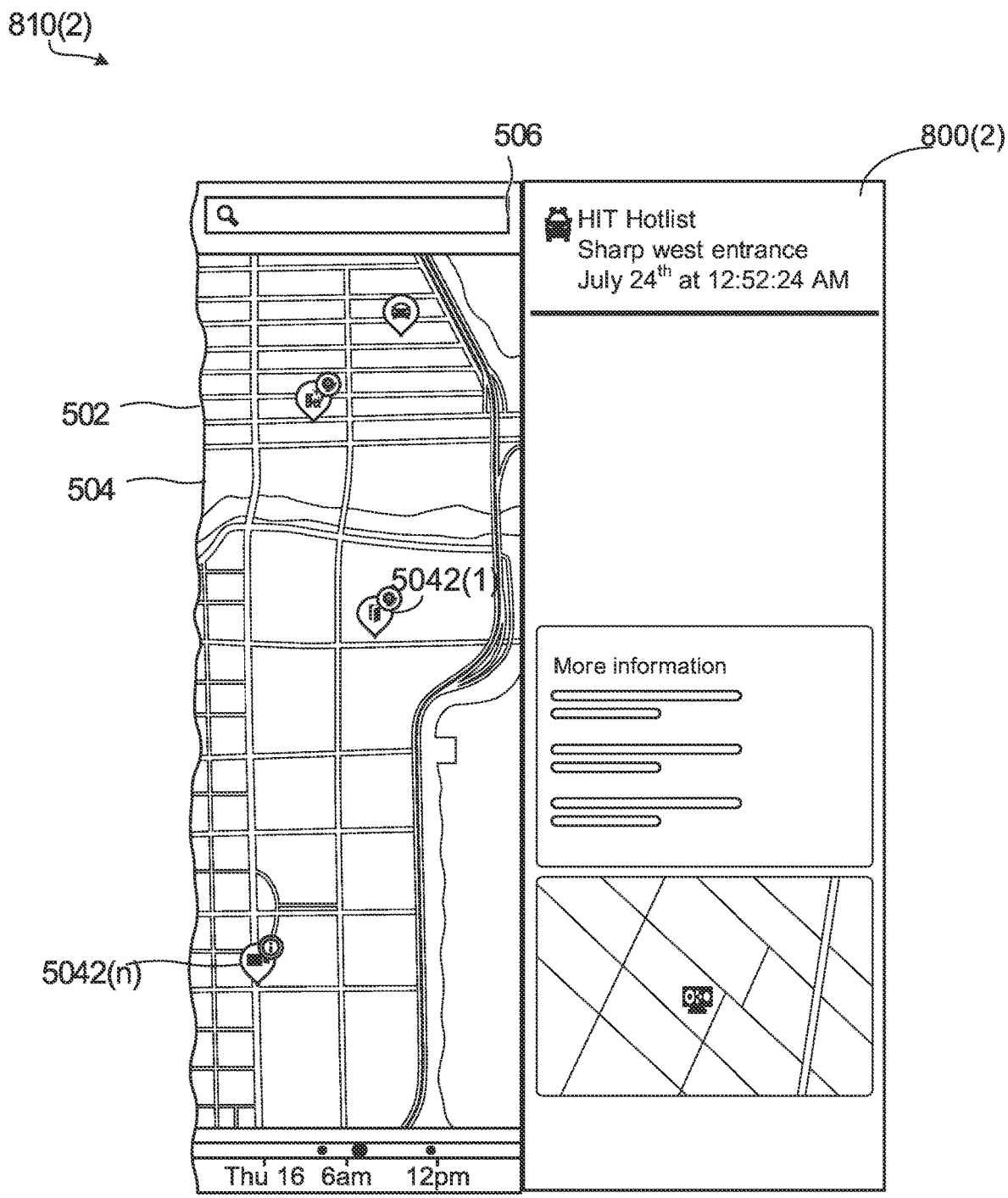

FIG. 8B illustrates an example second portion 800(2) associated with the license plate hotlist event, which is generated by the electronic device 112 and displayed on the GUI 810(2). The second portion 800(2) lists a description of the license plate hotlist event, which includes a location (e.g., sharp west entrance) of the event and a timestamp (e.g., July 24$^{th}$ at 12:52:24 AM). Moreover, the second portion 800(2) comprises a "more information" section to provide details of the license plate ID, for example including color, manufacturer, and/or model of the vehicle, one or more driver licenses, and historical accidents, and/or additional information associated with the location (e.g., historical accidents, timestamps). Furthermore, a thumbnail map is included in the second portion 800(2) to provide a detailed location (e.g., intersection address) of the hit.

Figure 8C:
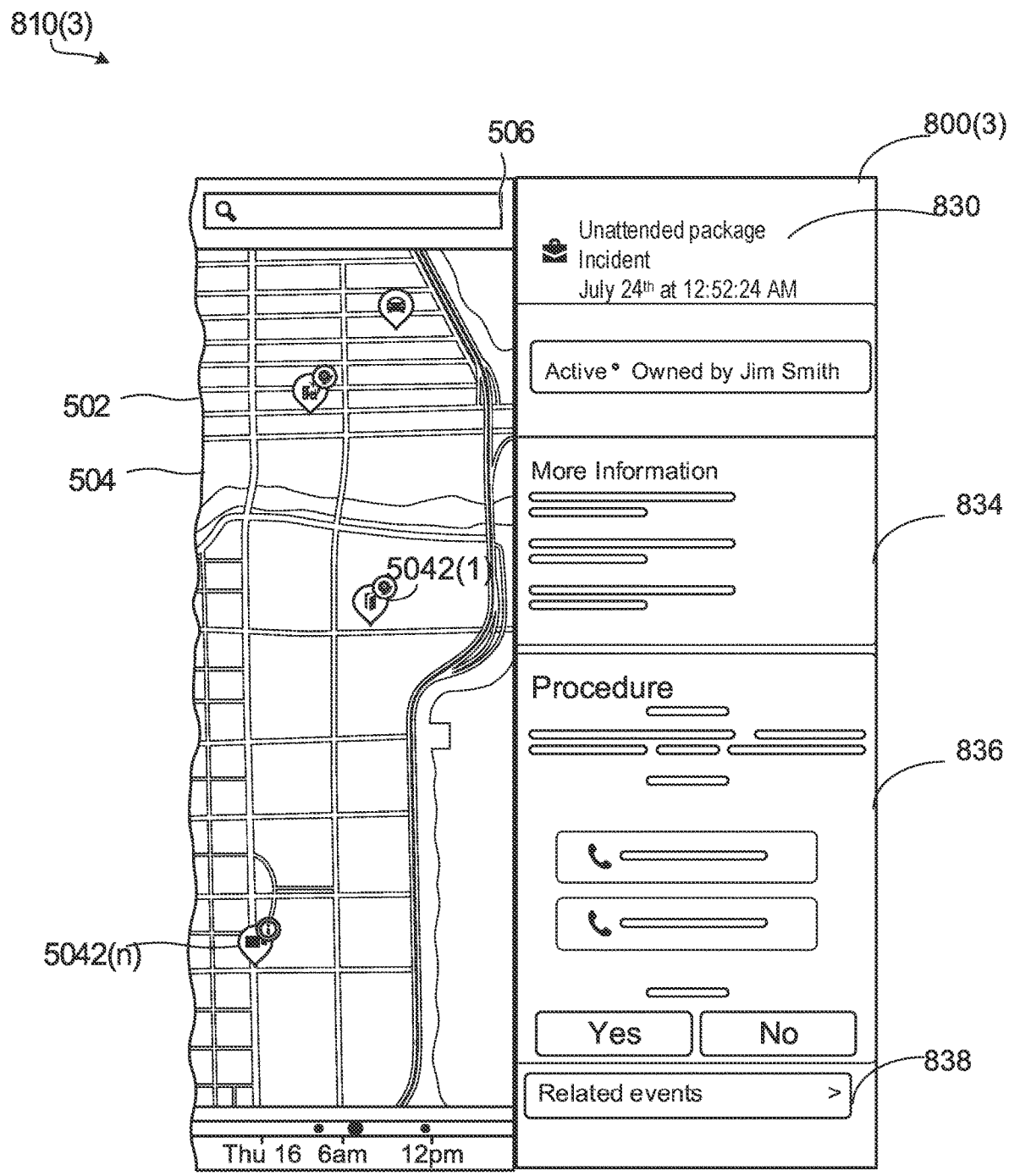

FIG. 8C shows an alternative second portion 800(3) which is concurrently displayed with the map 504 in the first portion 502 on a GUI 810(3), in response to an unattended package event being selected in the map 504. The unattended package means any inadvertent leaving of a purse, briefcase, or backpack in a common area during routine business where there is no evidence of any suspicious activity or observable malicious intent. Once the electronic device 112 receives a user input of selecting the unattended package event, the electronic device 112 obtains particular indicia based on the selection of the unattended package event. The indica may include a timestamp indicating when an unattended package is left, a location indicating where the unattended package is left, a reason of why the package is considered as unattended, and/or information (e.g., address, name, phone number) of a recipient, a type (e.g., incident) of the unattended package, and so on. The electronic device 112 then sends a respective query to each information source and requests to access plural information sources to retrieve different respective information of interest subsets based on different respective subsets of indicia. For instance, the electronic device 112 may retrieve one or more security alarm IDs associated with the location where the unattended package is delivered, phone numbers of an administrator, a work area supervisor, and/or security forces associated with the location.

As shown FIG. 8C, the second portion (e.g., second portion) 800(3) includes a description 830 of the event, for example including name (e.g., unattended package), type (e.g., incident), timestamp (e.g., July 24$^{th}$ at 12:52:24 AM) of the event, a status (e.g., active) of a security alarm associated with the location, an ID (e.g., Jim Smith) of the recipient, more information 834, procedure 836, and related events 838. The more information 834 may include at least one of IDs, phone numbers, email address, and/or address of a sender, a tracking number, a value of the package, and/or content of the package. The procedure 836 may indicate a reason why this package is considered as an unattended package and list a number of solutions. For example, excessive postage may be found on the package and/or protruding wires may appear outside of the package. The procedure 836 may further list a phone number of a work area supervisor, and a phone number of a police station, and prompt whether a phone call to any of the provided number should be initialized. The related events 838 may show other unattended package events of this location in a time period, such as in the last 30 days or the last 3 months.

Figure 8D:
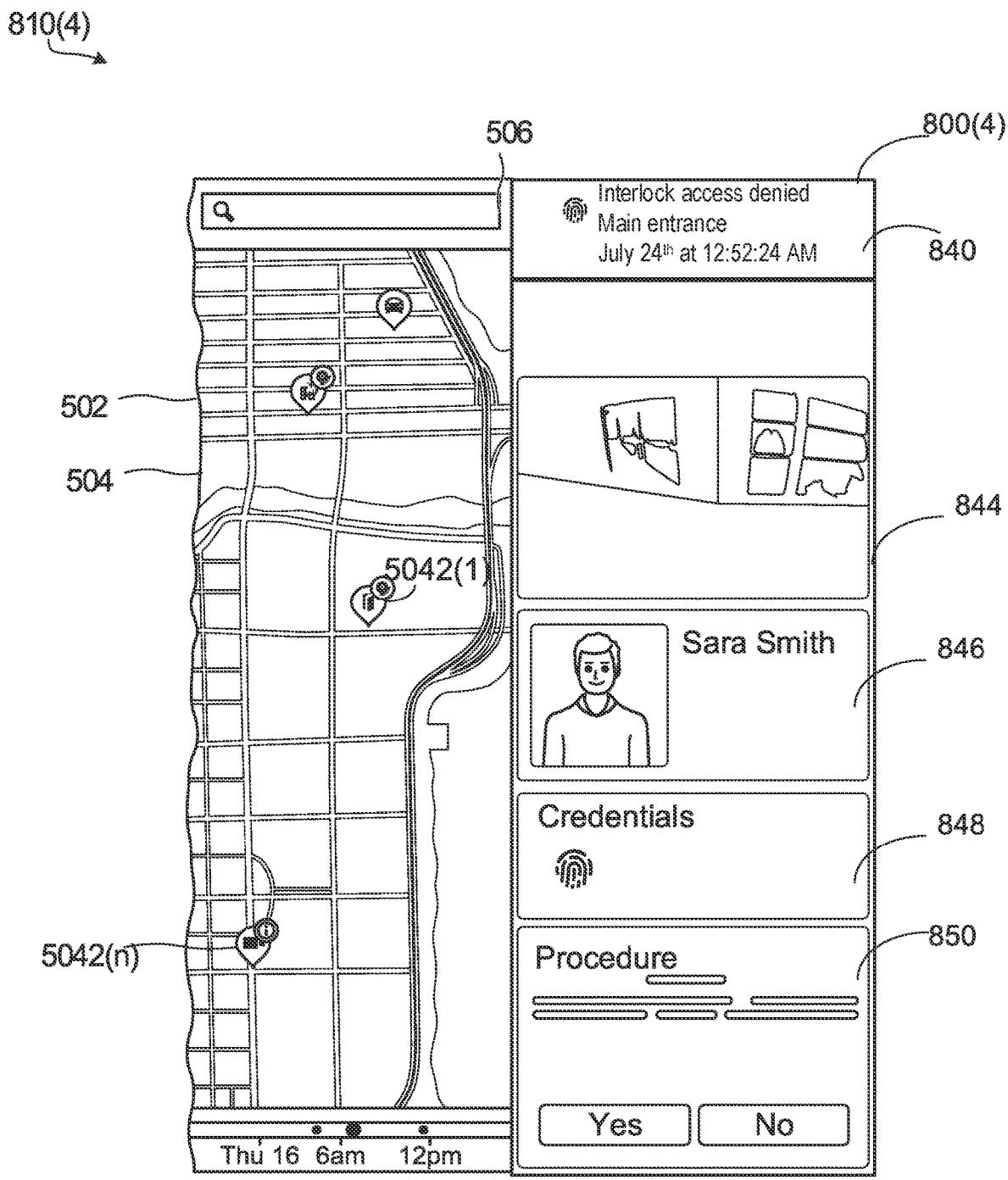

FIG. 8D shows another alternative example GUI 810(4) which displays a second portion 800(4) concurrently with the first portion 502 when the electronic device 112 receives user input of selecting an interlock access denied event. Indicia extracted by the electronic device 112 include a timestamp of the interlock access denied event, a location of the event, an access point ID (e.g., door ID), a badge ID, and credentials (e.g., a fingerprint) that are denied. The electronic device 112 may consult the event/entity database 208A to identify one or more information sources. Once the one or more information sources are identified, the electronic device 112 then sends queries to request accessing the one or more information sources (e.g., the information sources 104(1)-(n) in the communication network 100) to retrieve a respective information of interest subset that corresponds to each subset of the indicia. In particular, based on the credentials, an ID of a person associated the credentials are retrieved. One or more image processing system associated with a door identified by the door ID will also be extracted. Furthermore, in a first time period prior to the timestamp, a respective footage for each of the one or more image processing system may be retrieved from a corresponding information source. Once the respective information of interest subset is retrieved, at least part of the respective information of interest subset may be generated and displayed on the second portion 800(4) of the GUI 810(4).

As presented in FIG. 8D, the second portion 800(4) includes a description (also known as summary block) 840 of the event, an image block 844, an ID block 846, a credential block 848, and a procedure block 850. The summary block 840 details the location (e.g., main entrance), the time (July 24$^{th}$ at 12:52:24 AM), and a subtype (e.g., interlock access denied) of the event. The image block 844 shows that a snapshot presenting a scene of the interlock access being denied. The ID block 846 and the credential block 848 respectively demonstrate a name (e.g., Sara Smith), a photo, and a fingerprint of a person. The procedure block 850 may prompt a suggested operation or option to the user 160 to proceed. For example, the procedure block 850 may present a statement "Although the credentials of Sara Smith do not match credentials saved in our system, Sara Smith is an authorized user to this access. Do you want to update credentials of Sara Smith?" By extracting respective information of interest associated with the interlock access denied event from different respective information sources, the electronic device 112 may generate the information of interest on the second portion which is displayed on a same GUI with the first portion which prompts the interlock access denied event. Thus, the user 160 can access and review information of interest associated with the interlock access denied event without frequently navigating through the complex hierarchy of windows. Furthermore, leaving the map and the prompted event may be avoided if the user hopes to review details of the event to determine whether the prompted event is severe, which may help to increase efficiency of operations significantly.

FIGS. 8A-8D thus illustrate various alternative examples of second portions 800(1)-(4) (generically referred to as second portion 800) each of which is generated in response to user input selecting an event in any area of a graphical user interface. The indicia depend on a subtype of the event. Such examples demonstrate various designs (e.g., content and arrangement) of the second portion which is generated and concurrently displayed with a selected event presented on a map 504. In response to user input selecting a given event, indicia (e.g., a timestamp, a location, a type, an ID of a license plate, or a badge ID, and so on) associated with the given event is determined by the electronic device 112 by consulting the event/entity database 208A. Based on the indicia, the electronic device 112 may send a request to a database to identify one or more information sources each of which manages information of interest corresponding to each subset of the indicia. Once the one or more information sources are identified, the electronic device 112 then requests to access each of the one or more information sources to retrieve the information of interest corresponding to each subset of the indicia. The retrieved information of interest associated with the selected event is then displayed as a side pane which is on the same graphical user interface with the map. Such a method may help to provide suggested or preferred information of interest subset associated with the event for users' review in response to the event being selected. Thus, multiple operations for searching information of interest associated with the event may be avoided. Furthermore, in a scenario of an emergent event, users can acquire and look up the detailed information quickly without operating cumbersome operations on the graphical user interface. For examples, once the emergent event is selected, a thumbnail map displayed on a pane that is right beside the event may enable the user to locate the event accurately in a short time. Thus, efficiency of responding the emergent event and user experience may be improved significantly.

Other Examples of Selection of an Entity

Reference is now made with reference to FIGS. 9A-9I, which illustrate different example second portions 900(1)-900(9) (generically referred to as a second portion 900). Each second portion 900 is generated in response to a selection of an entity (e.g., entering one or more keywords, a security camera, an access point, a person, a videoconference camera, a building zone, a parking lot, a microphone, a telephone, a user note, etc.). It should be understood that the selection of the entity may be made in the first user input, the second user input, or any user input in a sequence of user inputs.

Figure 9A:
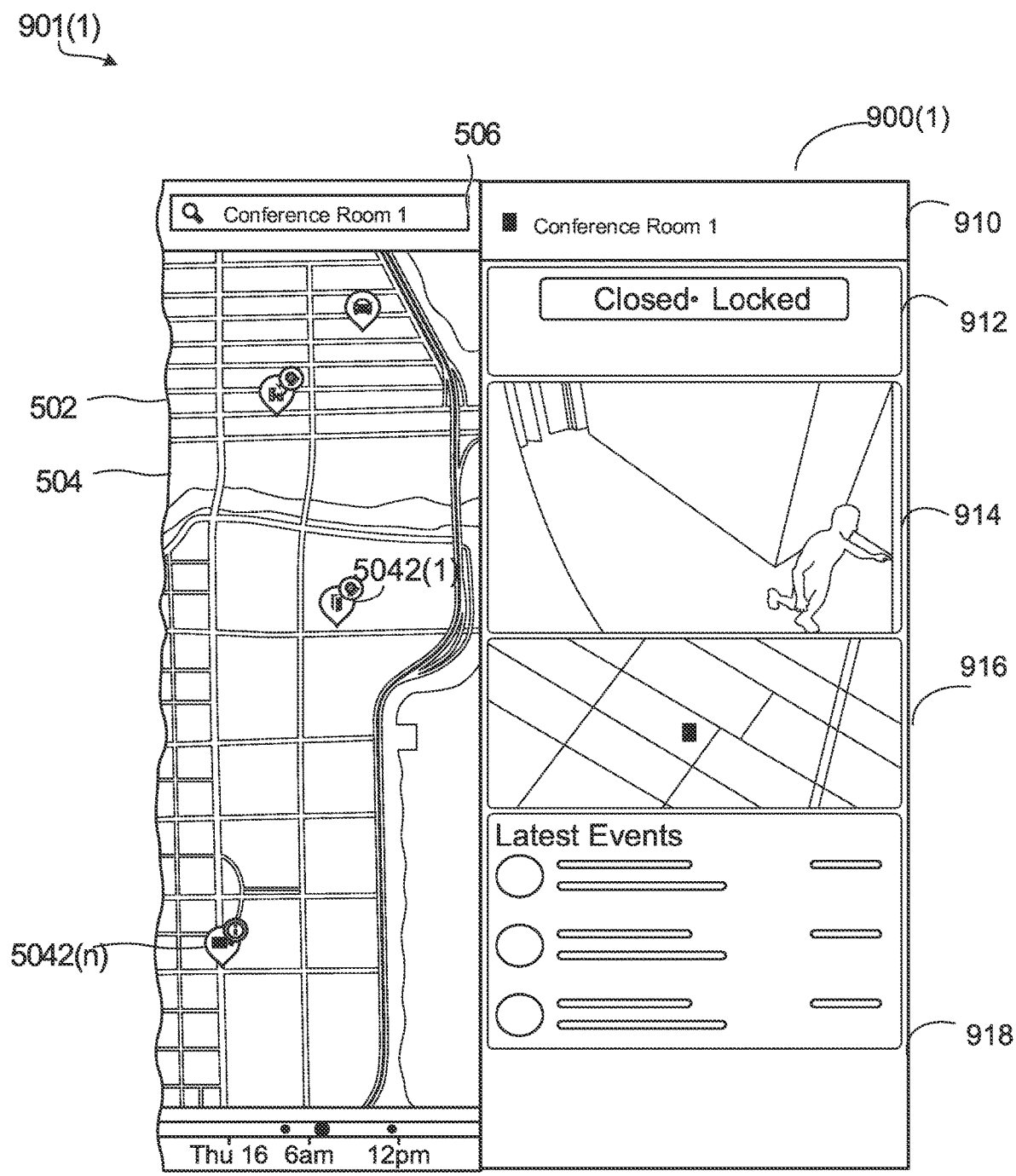
FIGS. 9A-9I are alternative exemplary user interfaces of receiving user input defining a different respective entity in accordance with example embodiments.

FIG. 9A illustrates that an example second portion 900(1) is generated and displayed on a GUI 901(1) in response to user input of selecting an entity which is performed by entering words in the search field 506. As shown in FIG. 9A, the words "Conference Room 1" are input into the search field 506. The associated indicia may thus include the keywords "Conference Room 1". The electronic device 112 may send a request to access one or more information sources 104 to search for information of interest associated with the words "Conference Room 1" and receive one or more messages from the one or more information sources 104. The one or more messages indicate the words "Conference Room 1" identifying a door at a given location. In addition, the electronic device 112 may retrieve the information of interest subsets including a status of the door, one or more image processing system IDs associated with the door, an image capturing a most recent event of the door, a thumbnail map showing a detailed location of the door, a number of badges accessed into the door in a time period.

As presented in FIG. 9A, the second portion 900(1) encompasses a summary block 910, a status block 912, an image block 914, a thumbnail map block 916, and a latest event block 918. The summary block 910 indicates the displayed second portion 900(1) is related to a door "Conference Room 1". The status block 912 shows a present status (e.g., closed and locked) of the door "Conference Room 1". The image block 914 provides a snapshot captured by one image processing system that is associated with the door "Conference Room 1". The thumbnail map 916 shows a zoomed in map which details the location (e.g., an intersection of two streets) of door, and the latest event block 918 demonstrates the number of badges accessed into the door in the time period. In some examples, the "Conference Room 1" may be presented as an entity of a door at any area of on the GUI 901(1). Since selecting the entity of "Conference Room 1" and entering the words "Conference Room 1" in the search field 506 belong to an identical subtype of the entity, the selection of the entity of "Conference Room 1" may result in a second pane similar to the second pane 900(1) which is generated in response to the user input of entering the words "Conference Room 1" in the search field 506.

Figure 9B:
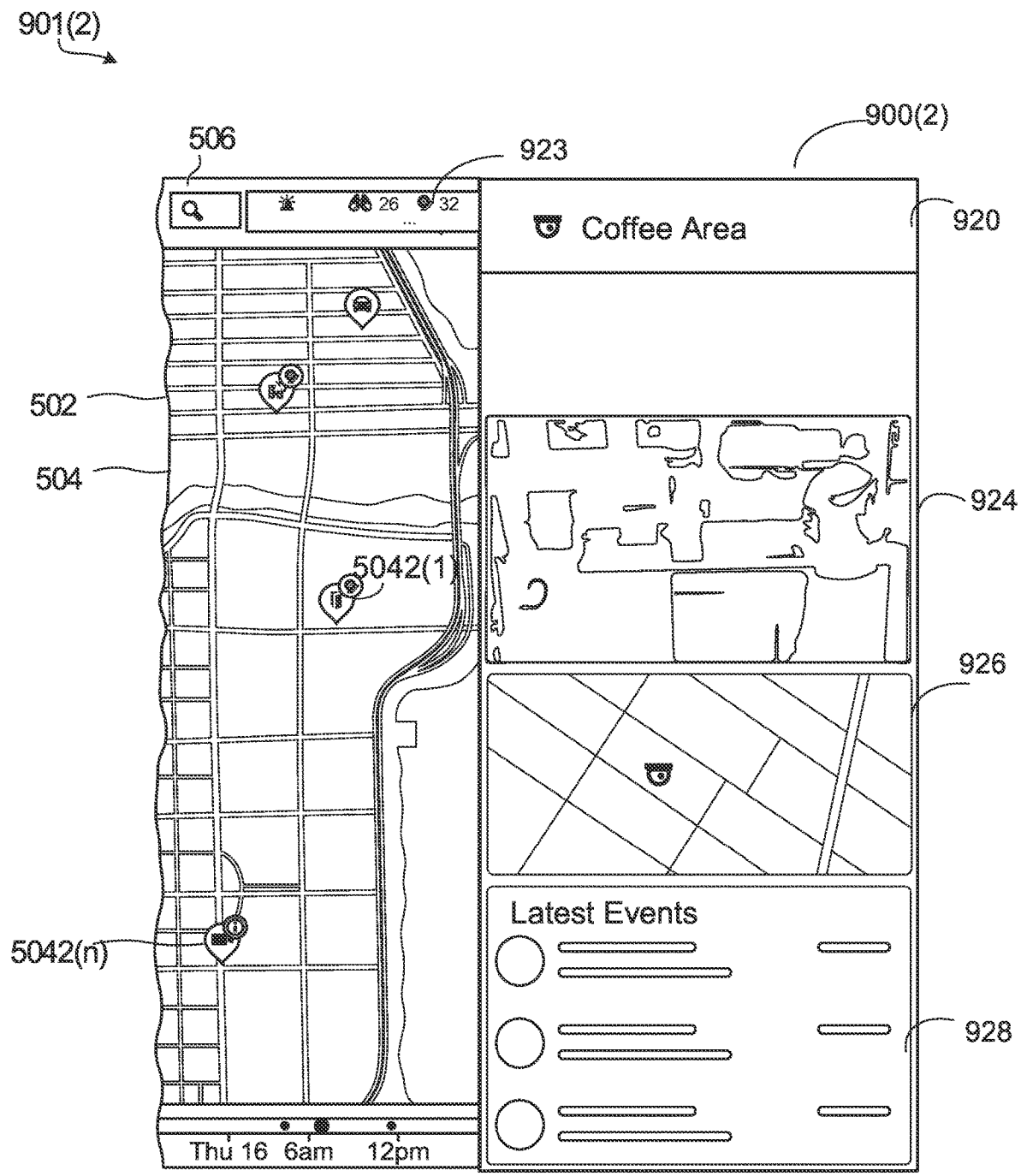

In alternative examples, FIG. 9B shows an example second portion 900(2) on a GUI 901(2) in response to user input of selecting a security camera entity 923 that is displayed in the sidebar. The indica associated with this entity may include a security camera ID and a location (e.g., coffee area) of the security camera. Based on the indica, the electronic device 112 may retrieve livestream footage in a time period preceding a time of requesting access to an information source which manages the livestream footage. Furthermore, a thumbnail map and a number of most recent events involving the security camera are received by the electronic device as well. The thumbnail map shows other entities in the vicinity of the security camera, and details the location (e.g., a building at an intersection of streets A and B) of the security camera.

As illustrated in FIG. 9B, the second portion 900(2) includes a summary block 920, an image block 924, a thumbnail map block 926, and a latest event block 928. In particular, the summary block 920 indicates that the second portion 900(2) is associated with a coffee area. The image block 924 provides a snapshot selected from the livestream footage. The thumbnail map 926 provides a location relative to streets where can be easily located by users or other entities in the vicinity of the security camera. The latest event block 928 lists the number of most recent events involving the security camera.

Figure 9C:
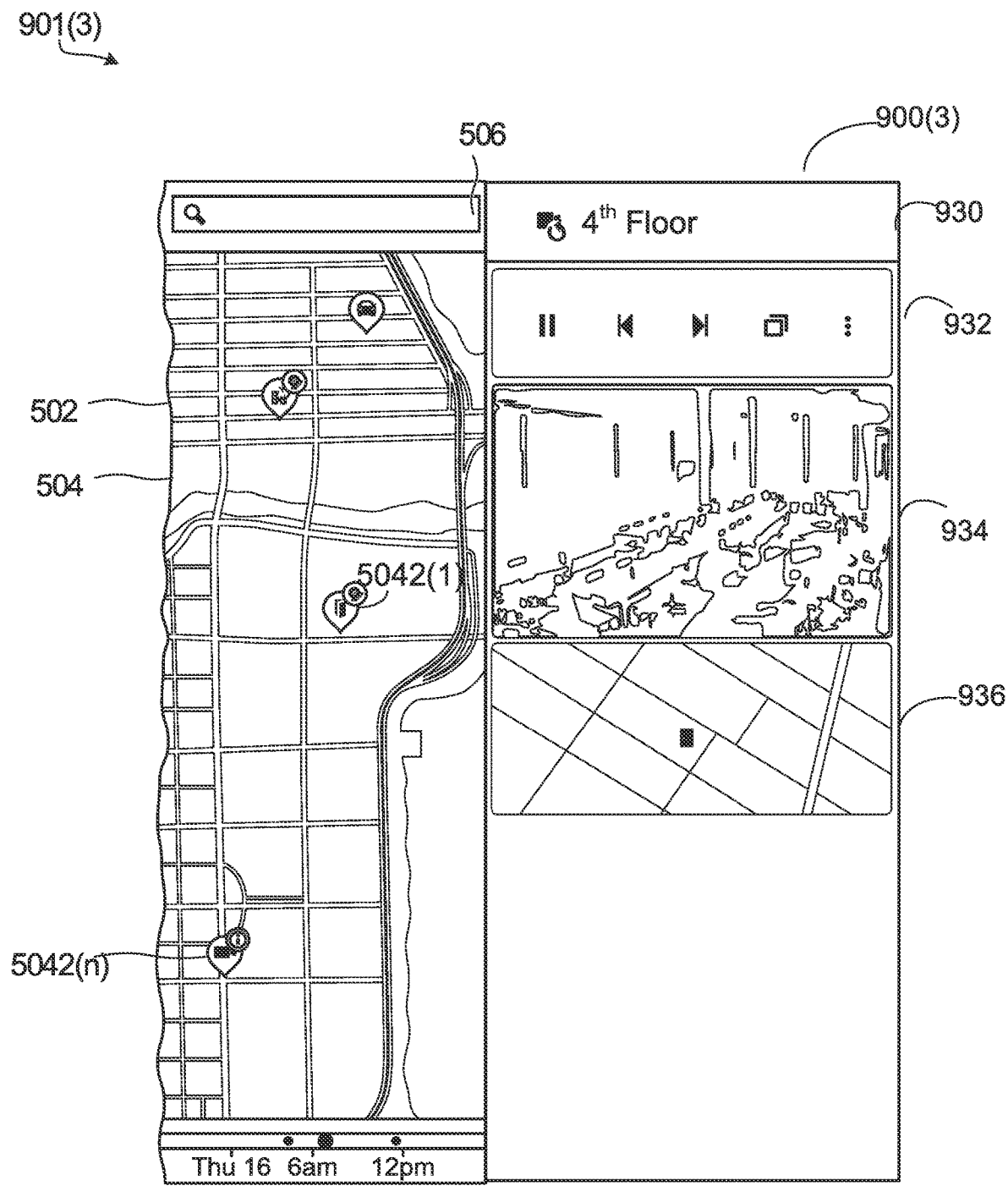

Similarly to FIG. 9B, FIG. 9C provides an example second portion 900(3) on a GUI 901(3) in response to user input of selecting an entity of a video conference camera, which may be displayed at the side bar 508 as shown in FIG. 5A. Indica of the video conference camera may include a video conference camera ID and a location (e.g., $4^{th}$ floor) of the video conference camera. Respective information of interest subsets obtained by the electronic device 112 are identical to those associated with indica of the security camera. Thus, content 930, 934, and 936 of the second portion 900(3) are similar to that of the second portion 900(2) of FIG. 9B. The only difference between FIG. 9C and FIG. 9B is that in FIG. 9C, a menu block 932 provides a plurality of menus to play the livestream footage captured by the video conference camera. The plurality of menus of the menu block 932 include "pause" button, "next video" button, "previous video" button, and so on.

Figure 9D:
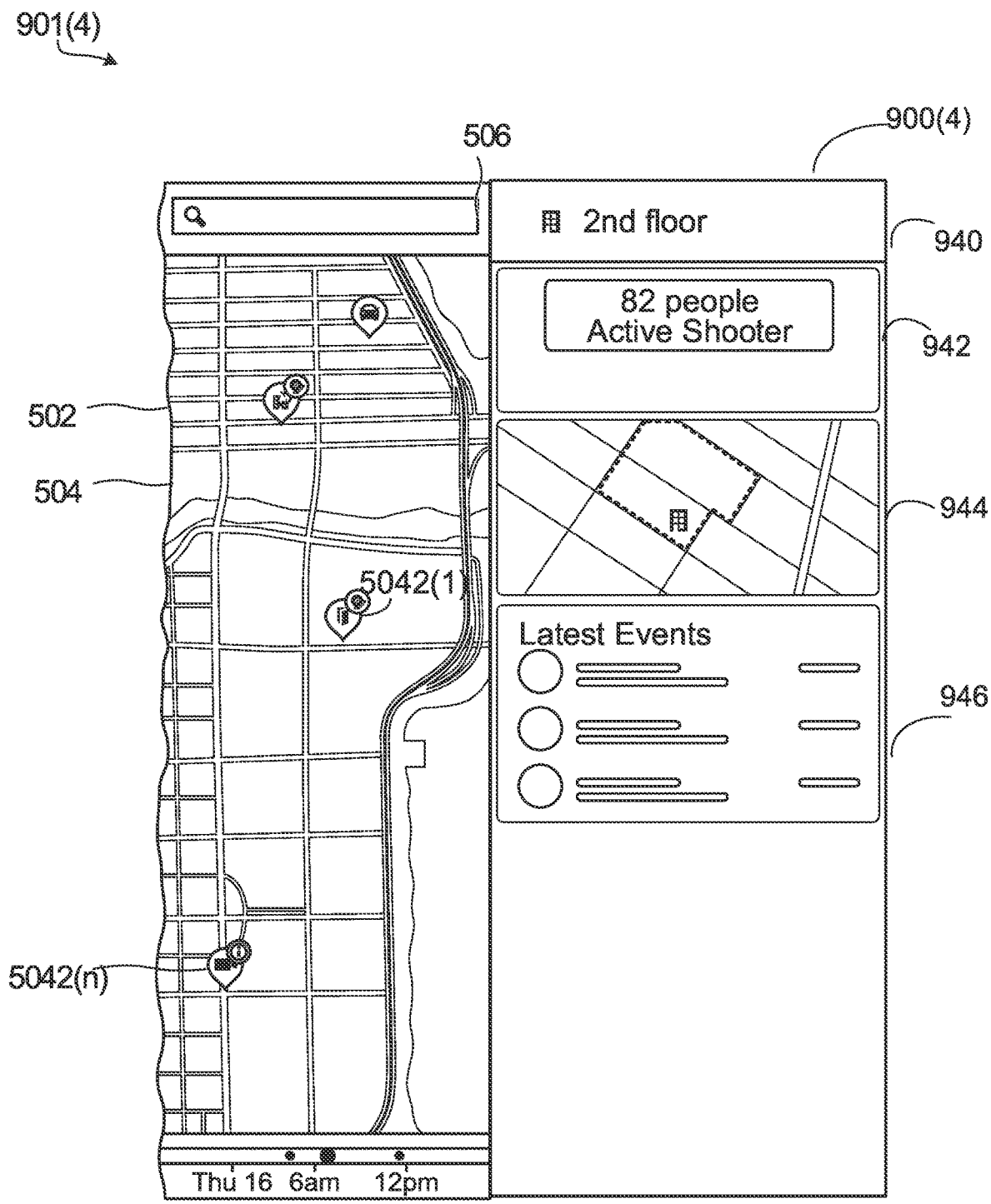

FIG. 9D provides an example second portion 900(4) on a GUI 901(4) in response to user input of selecting an entity of a building zone, which may be in an area of the first portion (e.g., map) as shown in FIG. 5A. Indica associated with the building zone may include a location (e.g., $2^{th}$ floor) of the building zone and a badge ID of a main entrance of the 2th floor. The electronic device 112 may access an information source 104 to determine how many people have entered in the main entrance of the 2th floor and identities (ID) of those people. Additionally, a report (e.g., active shooter) of a present event or an emergent event on the 2nd floor may also be retrieved by the electronic device 112 and displayed on the second portion 900(4). Furthermore, one or more image processing system IDs on the $2^{nd}$ floor of the building zone and a number of the most recent events involving the location or involving the present event/the emergent event may be retrieved as well. As presented in FIG. 9D, the second portion 900(4) includes a summary block 940, a status block 942, and a thumbnail block 944, and a latest event block 946. The summary block 940 indicates that the second portion 900(4) is associated with the $2^{nd}$ floor of the building zone. A notification indicating that there exists an active shooter and 82 people on the 2nd floor of the building zone is also shown in the status block 942. The thumbnail block 944 shows an area in the vicinity of the building zone which may be affected by the present event or the emergent event. The latest event block 946 lists the most recent 3 events associated with the location or the most recent 3 events occurred preceding the present event.

Figure 9E:
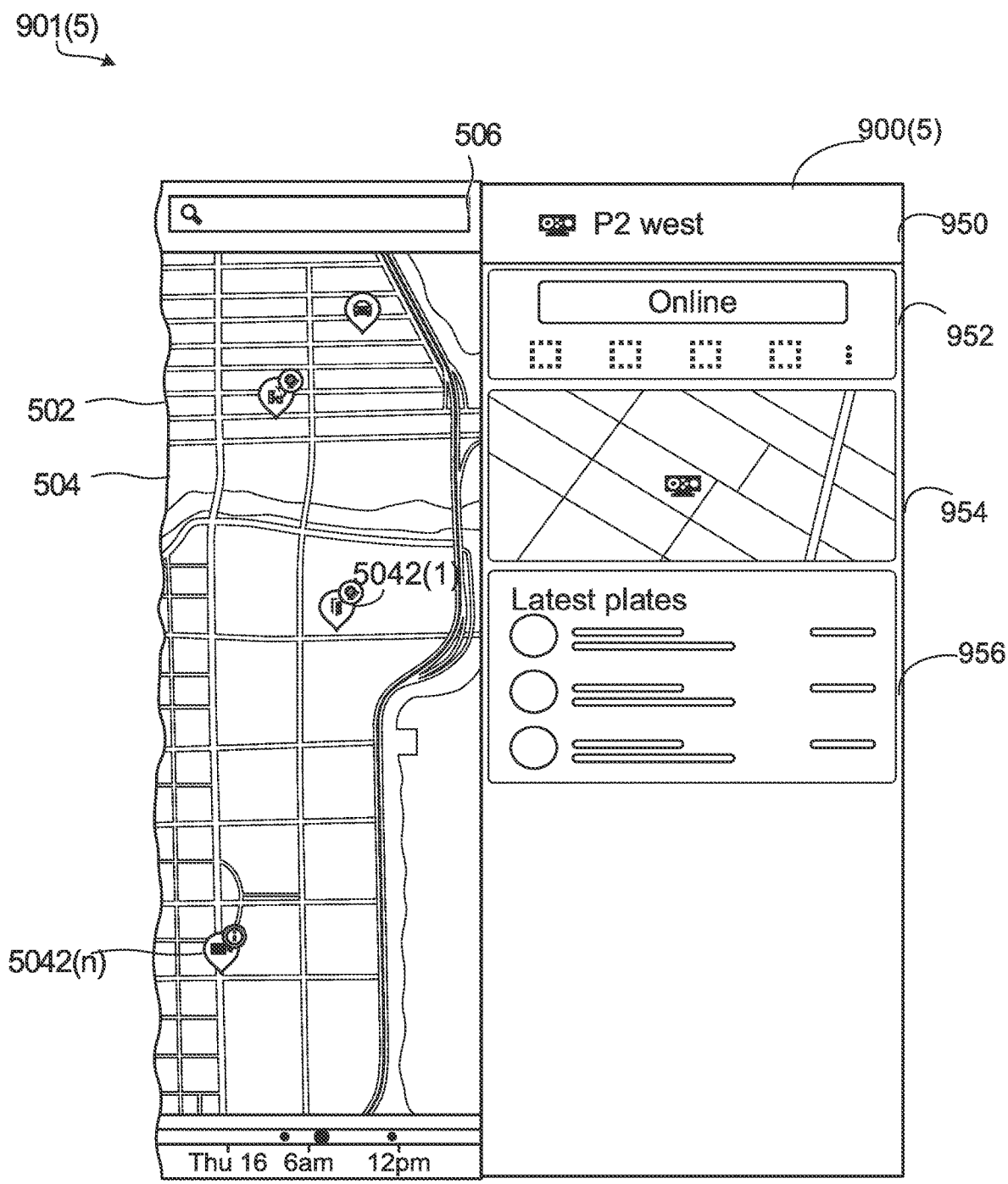

In the case of the entity being a parking lot, FIG. 9E demonstrates an alternative second portion 900(5) which is triggered to be generated by user input of selecting of the parking lot that is made on the map 504. Indicia associated with selecting of the parking lot includes an ID of the parking lot. The electronic device 112 then accesses different respective information sources 104 to retrieve one or more image processing system IDs (e.g., camera IDs), status of the one or more image processing system IDs, a number of plate IDs entering or exiting the parking lot. Accordingly, the information of interest subsets displayed on the second portion 900(6) may include a summary block 950, a status block 952, a thumbnail map block 954, and a latest plate block 956. The summary block 950 illustrates that the parking lot ID is P2 West, and the status block 952 lists a respective status (e.g., online) of each camera. The thumbnail map block 954 demonstrates an intersection between two streets where the parking lot is located. Moreover, the latest plate block 956 lists a number of latest plates that enters or exits the parking lot.

Figure 9F:
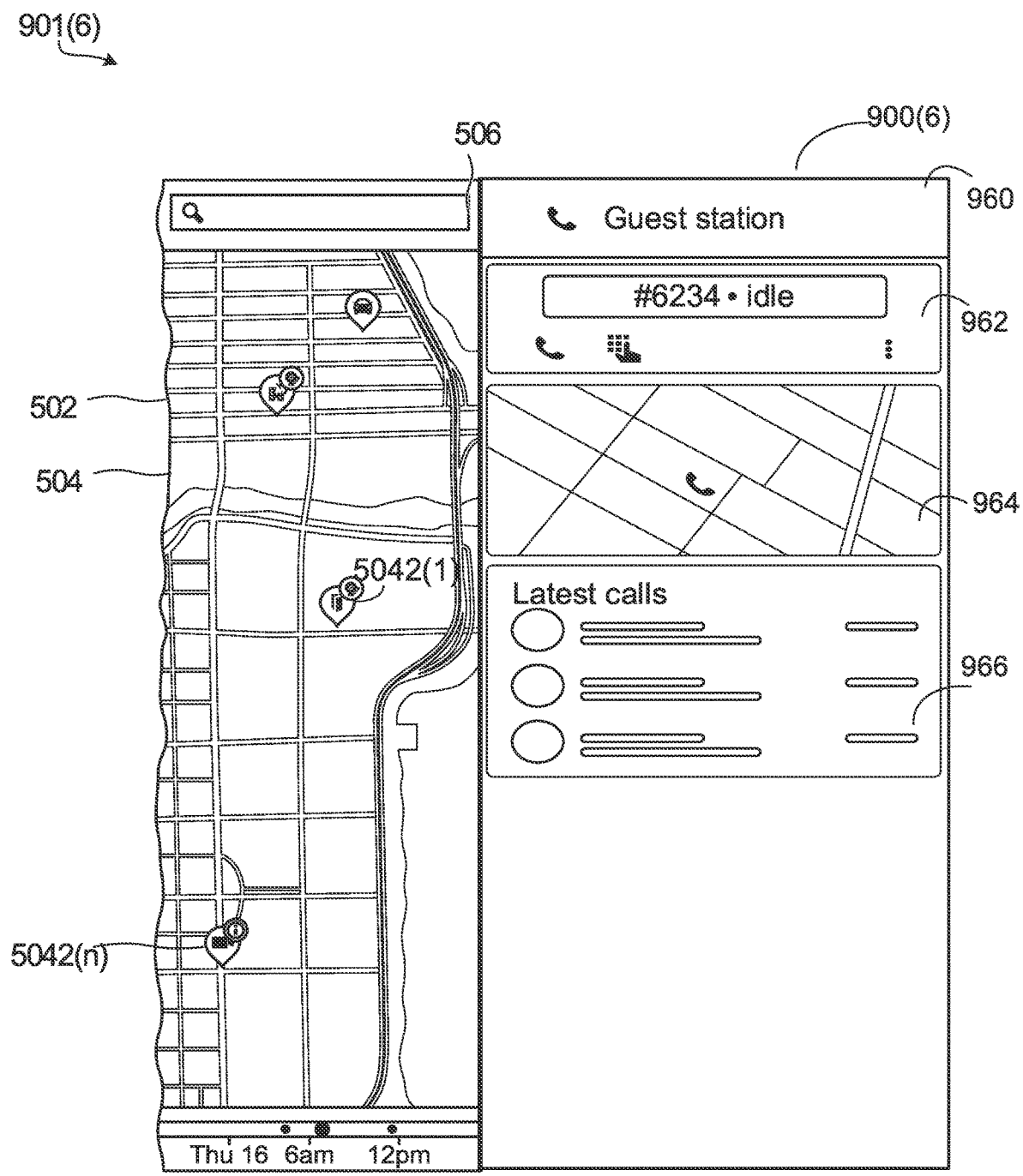

In case the entity is a guest station, the indicia associated with selecting the guest station are similar to the indicia associated with selection of a parking lot. Likewise, FIG. 9F illustrates a second portion 900(6) that is generated in response to a user selecting a guest station entity. Blocks 960, 964, and 966 are similar to those displayed in the second portion 900(5), except that a status block 962 shows which guest station is idle. For example, as shown in FIG. 9F, the status block 962 presents that guest station #6234 is idle, suggesting that guest station #6234 is available to be used.

Figure 9G:
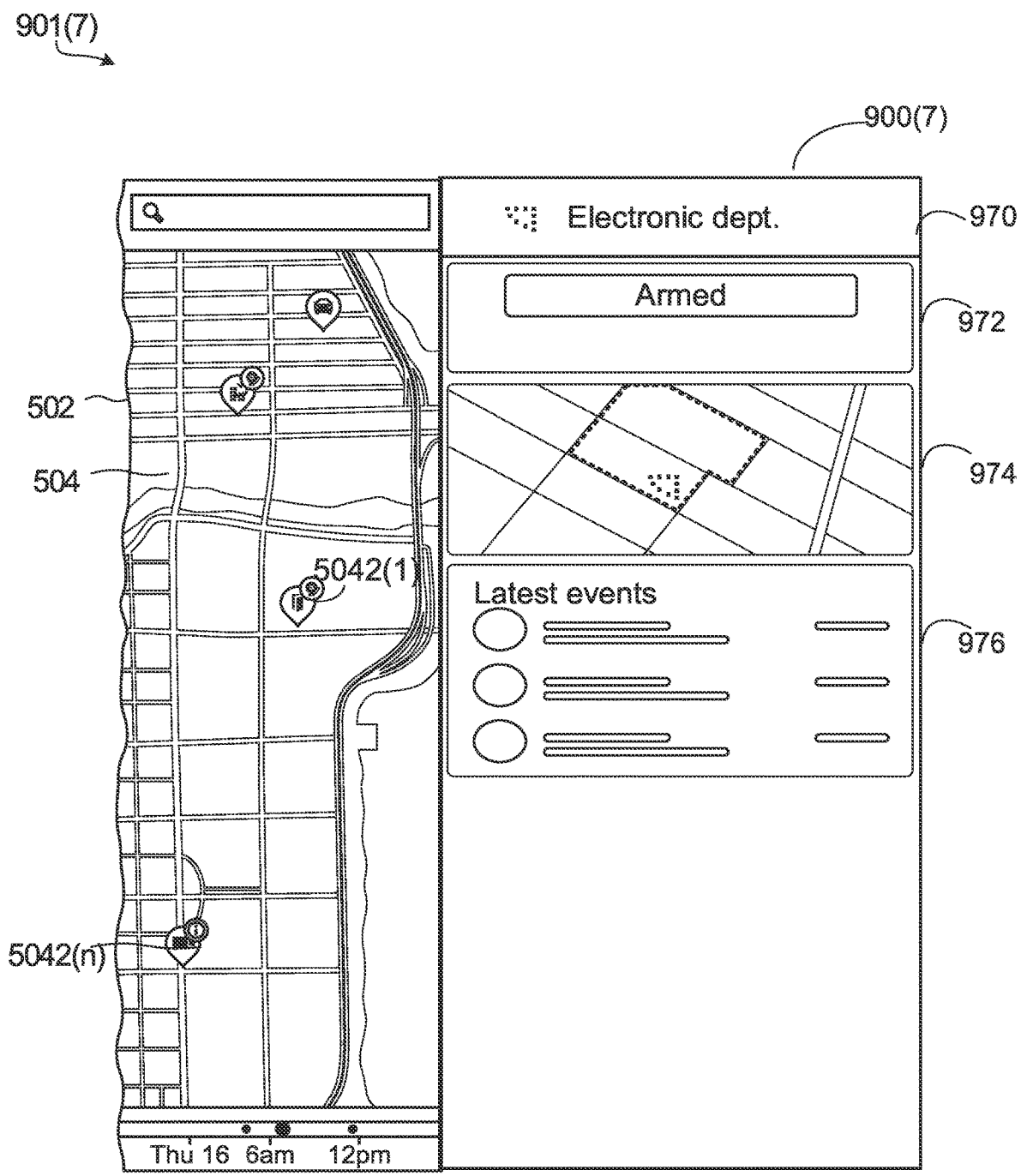

FIG. 9G shows another alternative example second portion 900(7) which is generated in response to user input of selecting of an area on the map 504 (e.g., a building zone, for example including an electronics department or a delimited area). In the case of selecting the building zone, blocks 970, 974, and 976 are similar to those displayed in the second portion 900(5), except that a status block 972 shows that the electronics department is armed. In the case of selecting the delimited area (e.g., a territory of a known gang, a zone within which a person under house arrest or on probation is permitted to travel, etc.) on the map 504, a second portion may be generated to present information relating to members of the gang, and latest events suspected of being associated with or perpetrated by the gang, and the like. When the delimited area being selected represents that a zone within which a particular person is permitted to travel (while under house arrest or probation), a second portion including a reason for the arrest or probation, an ID of the person, information about a tracking device worn by the person, and/or a criminal record of the person may be displayed concurrently with the map 504. Such detailed information of interest subset associated with an area may enable the operator to retrieve more detail about the area in a short time.

Figure 9H:
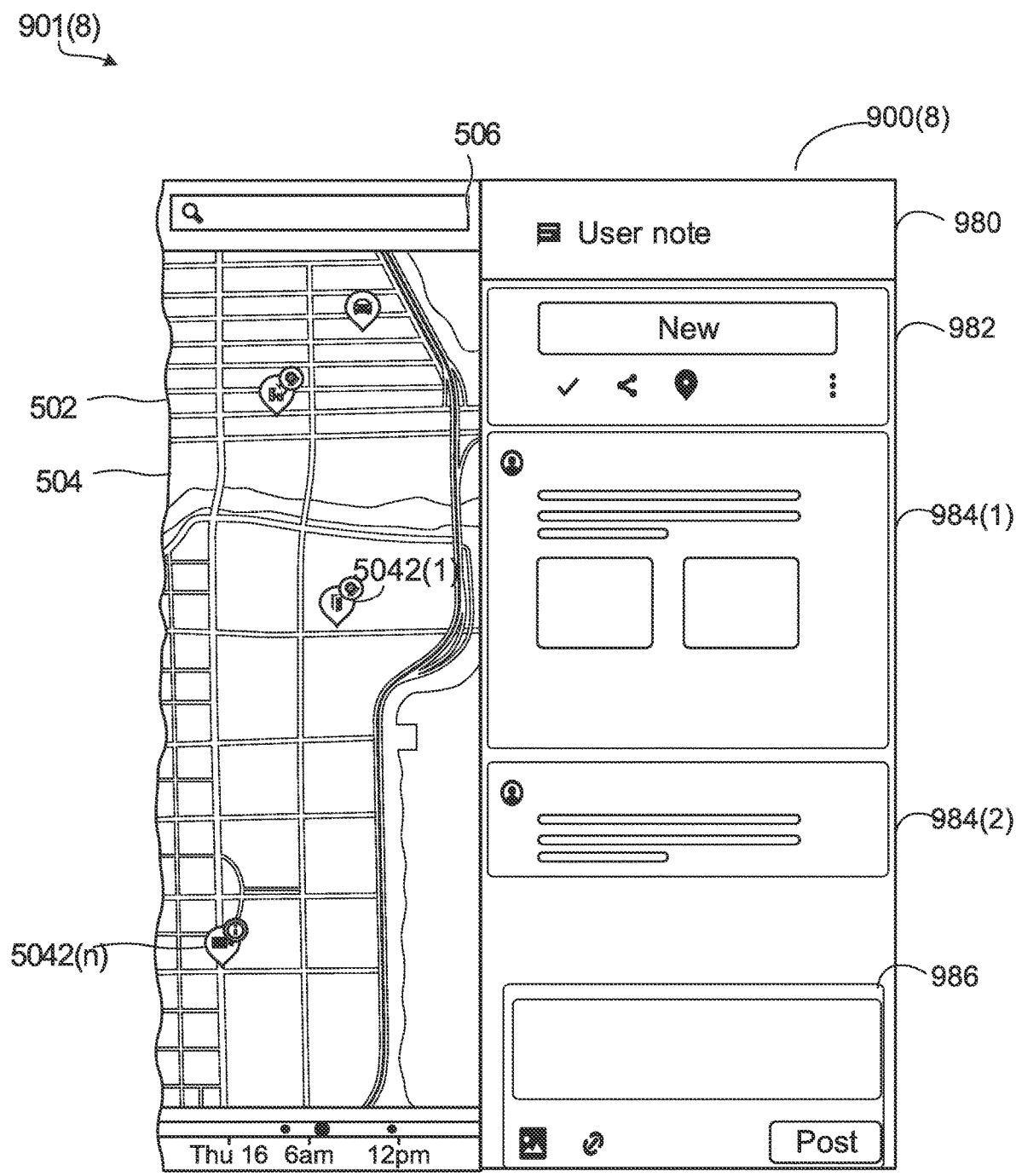

In some applications, the entity may include a user note, which is an entity that can be used to review and share event or information with other users. FIG. 9H demonstrates an alternative example second portion 900(8) which is generated and displayed in response to user input of selecting of a user note. When the user note is selected, the electronic device 112 may extract indicia of the user note including content of the user note, timestamp of the user note. Based on the indicia, a plurality of information sources are accessed to retrieve other user notes relevant to the content of the user note, and status of the user note. The second portion 900(8) includes a summary block 980, a status block 982, one or more review blocks 984(1)-984(2)(generically referred to as review block 984), and a post block 986. The summary block 980 describes that the entity is a user note. The status block 982 indicates the entity "user note" is new. The review block 984 presents one or more user notes that are relevant to the content of the selected user note. The one or more messages can be reviewed by the user 160 at the second portion 900(8). The post block 986 provides a space for the user 160 to share and post events or messages.

Figure 9I:
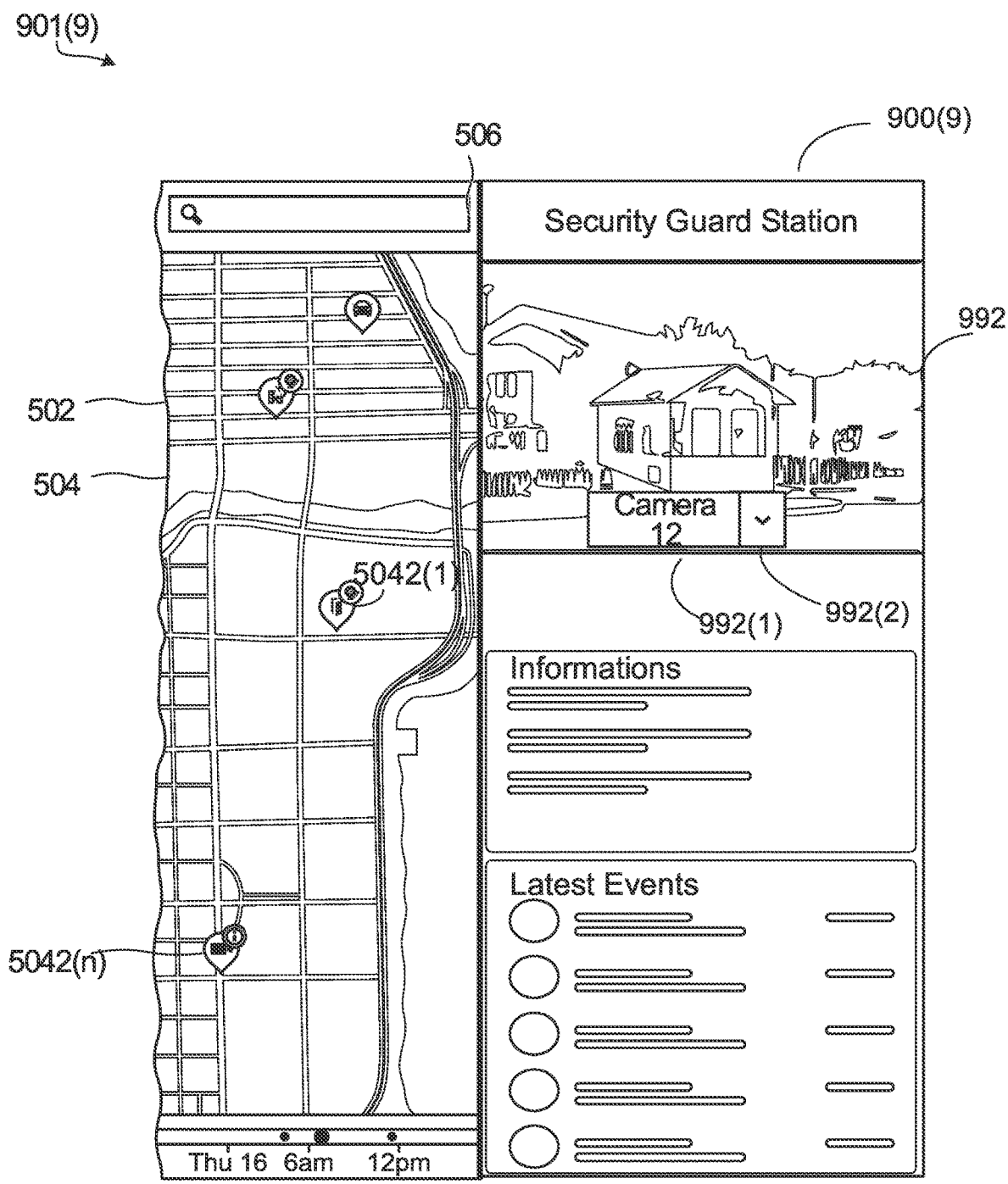

In case the entity is a security guard station, FIG. 9I shows an alternative example second portion 900(9) which is generated and displayed in response to user input of selecting of a security guard station. An arrangement of the second portion 900(9) is similar to that of other entities (e.g., guest station), except that an image block 992 indicates a camera ID 992(1) (e.g., camera 12) which identifies a corresponding camera capturing an image displayed in the image block 992. Furthermore, the image block 992 provides options 992(2) which is selectable to choose other cameras associated with the security guard station. When the user 160 switches to a camera ID other than the camera 12, the corresponding image may be changed accordingly.

CONCLUSION

The present disclosure depicts a method and a system to retrieve information of interest subsets in response to user input that incudes selection of an event or an entity. Based on the user input (and depending on whether what was selected is an entity or an event), corresponding indicia may be determined by the electronic device and individual subsets of this indicia can be used to identify respective information sources from which to retrieve information the of interest subsets. Accordingly, a second portion including the retrieved information of interest subsets is displayed concurrently with a first portion (e.g., a map and/or a search field on a first portion) on a graphical user interface of an electronic device. When the user is interested in any information element on the second portion, the user can select the information element on the second portion, and another second portion including information of interest associated with the selected information element may be displayed to at least partially replace the previously generated second portion. In either case, the second portion (whether initially generated or newly generated) is displayed concurrently with the first portion and thus may enable the user to investigate an event or entity efficiently. Thus, cumbersome navigation through multiple menus may be reduced significantly, which may help the user concentrate on a geographic area of interest on the map while more detailed information (i.e., the information of interest subsets) is displayed in the second portion of the graphical user interface.

It should be understood that the first portion 502 comprises a map 504. This is only illustrative and is not intended to be limiting. In other examples, the first portion 502 may include a notification (e.g., a security camera is out of storage) or a list of events without a map. In other applications, the first portion may have yet different configurations.

It is also noted that although identifying a plurality of the information sources and communication between the electronic device with the information sources are illustrated with reference to FIG. 6 in response to the first user input, similar processes for identifying and accessing the information sources may be triggered by user input other than the first user input. In other possible alternative examples, processes for identifying and accessing the information sources may be performed in any suitable manner.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, certain technical solutions of the present disclosure may be embodied in the form of a software product. A suitable software product may be stored in a pre-recorded storage device or other similar non-volatile or non-transitory computer readable medium, for example. The software product includes instructions tangibly stored thereon that enable a processing device (e.g., a microprocessor) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

Although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented user interface control method, performed at an electronic device with access to a user interface, comprising:
generating a map for display in a first portion of the user interface, wherein the map includes one or more icons each of which represents an event having occurred in a respective area of the map;
detecting user input made in an area of the user interface, wherein the user input comprises one of selection of at least one of the one or more icons and selection of an entity associated with occurrence of a particular event in a particular area of the map; and
in response to detecting the user input:
obtaining indicia based on the user input;
accessing plural information sources based on respective subsets of the indicia to retrieve respective information of interest subsets corresponding to the respective subsets of the indicia; and
generating a second portion of the user interface for concurrent display with the map in the first portion, the second portion comprising the retrieved information of interest subsets.

2. The method defined in claim 1, wherein the first portion and the second portion of the user interface are respectively a first pane and a second pane of the user interface, and wherein the retrieved information of interest subsets are presented together within the second pane of the user interface.

3. The method defined in claim 1, wherein accessing the plural information sources is achieved over plural separate, secure data connections.

4. The method defined in claim 1, wherein at least two of the information sources comprise separate databases.

5. The method defined in claim 1, wherein at least two of the information sources comprise separate portions of a common database.

6. The method defined in claim 1, wherein said accessing comprises accessing a first one of the information sources based on a first subset of the indicia to retrieve a first information of interest subset corresponding to the first subset of the indicia.

7. The method defined in claim 6, wherein said accessing the first one of the information sources comprises causing the first one of the information sources to generate a report based on the first subset of the indicia and truncating the report to create the first information of interest subset.

8. The method defined in claim 1, wherein the event comprises at least one of an access granted event, a glass broken event, a hit hotlist event, an unattended package event, and an interlock access denied event.

9. The method defined in claim 1, wherein the entity comprises at least one of a security camera, an access point, a person, a videoconference camera, a building zone, a parking lot, a microphone, a telephone, and a user note.

10. The method defined in claim 1, wherein when the user input comprises selection of the particular event, the indicia includes a timestamp indicative of when the particular event occurred.

11. The method defined in claim 10, wherein the indicia further includes a location indicative of where the particular event occurred.

12. The method defined in claim 1, wherein the area of the user interface is located in the first portion.

13. The method defined in claim 1, wherein the area of the user interface is located in a third portion that is neither the map nor the second portion.

14. The method defined in claim 1, further comprising identifying the plural information sources based on the respective subsets of the indicia.

15. The method defined in claim 14, wherein the identifying comprises consulting a database that maps each of the plural information sources to a respective subset of indicia.

16. The method defined in claim 14, wherein the accessing plural information sources based on respective subsets of the indicia to retrieve respective information of interest subsets corresponding to the respective subsets of indicia further comprises:
sending a respective query to each of the plural information sources, and
receiving the respective information of interest subset corresponding to each respective subset of indicia in response to the respective query.

17. The method defined in claim 16, wherein at least two of the plural information sources are queried contemporaneously.

18. The method defined in claim 1, wherein the user input comprises the indicia.

19. The method defined in claim 1, the user input being first user input, the indicia being first indicia, the information sources being first information sources, the retrieved information of interest subsets being first information of interest subsets, the first information of interest subsets collectively including at least one information element defining an event or an entity, the method further comprising:
detecting second user input made in the second portion, the second user input identifying one of the at least one information element;
in response to detecting the second user input:
obtaining second indicia based on the second user input;
accessing plural second information sources based on respective subsets of the second indicia to retrieve respective second information of interest subsets corresponding to the respective subsets of the second indicia; and
re-generating the second portion for concurrent display with the map in the first portion, the second portion comprising the retrieved second information of interest subsets.

20. The method defined in claim 19, wherein at least one of the first information sources and a corresponding one of the second information sources are the same information source.

21. The method defined in claim 19, further comprising replacing at least some of the retrieved first information of interest subsets with at least some of the retrieved second information of interest subset in the second portion.

22. The method defined in claim 1, wherein the user interface includes a screen and wherein the first portion occupies an area of the screen greater in size than an area of the screen occupied by the second portion.

23. A device, comprising:
a user interface;
one or more processors;
memory; and
one or more programs, wherein the one or more programs are stored in the memory and configured to be executed by the one or more processors, the programs including:
instructions for generating a map for display in a first portion of the user interface, wherein the map includes one or more icons each of which represents an event having occurred in a respective area of the map;
instructions for detecting user input made in an area of the user interface, wherein the user input comprises one of selection of at least one of the one or more icons and selection of an entity associated with occurrence of a particular event in a particular area of the map; and
in response to detecting the user input:
instructions for obtaining indicia based on the user input;
instructions for accessing plural information sources based on respective subsets of the indicia to retrieve respective information of interest subsets corresponding to the respective subsets of the indicia; and
instructions for generating a second portion of the user interface for concurrent display with the map in the first portion, the second portion comprising the retrieved information of interest subsets.

24. The device defined in claim 23, wherein the first portion and the second portion of the user interface are respectively a first pane and a second pane of the user interface, and wherein the retrieved information of interest subsets are presented together within the second pane of the user interface.

25. The device defined in claim 23, wherein the instructions for accessing comprise instructions for accessing a first one of the information sources based on a first subset of the indicia to retrieve a first information of interest subset corresponding to the first subset of the indicia.

26. The device defined in claim 25, wherein the instructions for accessing the first one of the information sources comprise instructions for causing the first one of the information sources to generate a report based on the first subset of the indicia and truncating the report to create the first information of interest subset.

27. The device defined in claim 23, wherein the programs further include instructions for identifying the plural information sources based on the respective subsets of the indicia.

28. The device defined in claim 27, wherein the instructions for identifying comprise instructions for consulting a database that maps each of the plural information sources to a respective subset of indicia.

29. The device defined in claim 27, wherein the instructions for accessing plural information sources based on respective subsets of the indicia to retrieve respective information of interest subsets corresponding to the respective subsets of indicia further comprise:
instructions for sending a respective query to each of the plural information sources, and
instructions for receiving the respective information of interest subset corresponding to each respective subset of indicia in response to the respective query.

30. The device defined in claim 23, the user input being first user input, the indicia being first indicia, the information sources being first information sources, the retrieved information of interest subsets being first information of interest subsets, the first information of interest subsets collectively including at least one information element defining an event or an entity, the programs further including:
instructions for detecting second user input made in the second portion, the second user input identifying one of the at least one information element;
in response to detecting the second user input:
instructions for obtaining second indicia based on the second user input;
instructions for accessing plural second information sources based on respective subsets of the second indicia to retrieve respective second information of interest subsets corresponding to the respective subsets of the second indicia; and
instructions for re-generating the second portion for concurrent display with the map in the first portion, the second portion comprising the retrieved second information of interest subsets.

31. The device defined in claim 30, wherein the programs further include instructions for replacing at least some of the retrieved first information of interest subsets with at least some of the retrieved second information of interest subset in the second portion.

32. A non-transitory computer readable storage medium having stored therein instructions, which when executed by a device, cause the device to:
generate a map for display in a first portion of the user interface, wherein the map includes one or more icons each of which represents an event having occurred in a respective area of the map;
detect user input made in an area of the user interface, wherein the user input comprises one of selection of at least one of the one or more icons and selection of an entity associated with occurrence of a particular event in a particular area of the map; and
in response to detecting the user input:
obtain indicia based on the user input;
access plural information sources based on respective subsets of the indicia to retrieve respective information of interest subsets corresponding to the respective subsets of the indicia; and
generate a second portion of the user interface for concurrent display with the map in the first portion, the second portion comprising the retrieved information of interest subsets.

* * * * *